(12) United States Patent
Park et al.

(10) Patent No.: US 10,636,430 B2
(45) Date of Patent: Apr. 28, 2020

(54) VOICE INPUTTING METHOD, AND ELECTRONIC DEVICE AND SYSTEM FOR SUPPORTING THE SAME

(71) Applicant: SAMSUNG ELECTRONICS CO., LTD., Suwon-si, Gyeonggi-do (KR)

(72) Inventors: Jun Hyung Park, Seoul (KR); No Joon Park, Seongnam-si (KR); Hyo Jung Lee, Goyang-si (KR); Tae Hee Lee, Seongnam-si (KR); Geon Soo Kim, Suwon-si (KR); Han Jib Kim, Suwon-si (KR); Yong Joon Jeon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 167 days.

(21) Appl. No.: 15/869,289

(22) Filed: Jan. 12, 2018

(65) Prior Publication Data
US 2018/0218739 A1 Aug. 2, 2018

(30) Foreign Application Priority Data
Jan. 31, 2017 (KR) .................. 10-2017-0014024

(51) Int. Cl.
*G10L 17/10* (2013.01)
*G10L 17/22* (2013.01)
(Continued)

(52) U.S. Cl.
CPC .............. *G10L 17/22* (2013.01); *G06F 21/32* (2013.01); *G10L 15/22* (2013.01); *G10L 15/265* (2013.01);
(Continued)

(58) Field of Classification Search
CPC ......... G10L 17/22; G10L 17/00; G10L 17/06; G10L 17/24; G10L 17/04; G10L 17/02;
(Continued)

(56) References Cited

U.S. PATENT DOCUMENTS

| 6,332,139 | B1 * | 12/2001 | Kaneko | .................. H04N 7/147 |
| 9,721,086 | B2 * | 8/2017 | Shear | ...................... G06F 21/45 |
| 2004/0022444 | A1 * | 2/2004 | Rhoads | .............. G06K 9/00577 382/232 |
| 2010/0106975 | A1 * | 4/2010 | Vandervort | ............. G06F 21/32 713/186 |

(Continued)

FOREIGN PATENT DOCUMENTS

| JP | 2004-318731 | 11/2004 |
| JP | 2007-140631 | 6/2007 |
| WO | 2017/012496 | 1/2017 |

OTHER PUBLICATIONS

Extended Search Report dated Jun. 29, 2018 in counterpart European Patent Application No. 18154072.5.

*Primary Examiner* — Vijay B Chawan
(74) *Attorney, Agent, or Firm* — Nixon & Vanderhye P.C.

(57) ABSTRACT

An electronic device is provided. The electronic device includes a microphone configured to receive a voice, communication circuitry configured to communicate with an external electronic device, a memory, and a processor operatively connected to the microphone, the communication circuitry, and the memory. The memory stores instructions that, when executed by the processor, cause the electronic device to perform voice recognition for voice data corresponding to the voice, and determine whether to perform voiceprint recognition for the voice data based on whether a first expression is included in a result of the voice recognition.

17 Claims, 16 Drawing Sheets

(51) Int. Cl.
   *G10L 17/00*      (2013.01)
   *G06F 21/32*      (2013.01)
   *G10L 15/22*      (2006.01)
   *G10L 15/26*      (2006.01)
   *G10L 17/06*      (2013.01)

(52) U.S. Cl.
   CPC .............. *G10L 17/00* (2013.01); *G10L 17/06* (2013.01); *G10L 17/10* (2013.01); *G10L 2015/223* (2013.01)

(58) Field of Classification Search
   CPC ......... G10L 17/10; G10L 17/14; G10L 15/22; G10L 15/08; G10L 15/02; G10L 15/083; G10L 15/18

USPC .... 704/246, 250, 170, 270.1, 231, 273, 270; 455/418, 420, 88; 707/999.006
   See application file for complete search history.

(56) References Cited

U.S. PATENT DOCUMENTS

| | | | |
|---|---|---|---|
| 2011/0212717 A1* | 9/2011 | Rhoads | H04N 5/23219 455/420 |
| 2014/0080428 A1* | 3/2014 | Rhoads | H04W 4/70 455/88 |
| 2015/0033305 A1* | 1/2015 | Shear | G06F 21/45 726/11 |
| 2015/0213453 A1 | 7/2015 | Tonini | |
| 2015/0302586 A1* | 10/2015 | Fukata | G06K 9/00791 382/103 |
| 2015/0302856 A1* | 10/2015 | Kim | G10L 17/22 704/273 |
| 2016/0189149 A1 | 6/2016 | MacLaurin et al. | |
| 2016/0253651 A1* | 9/2016 | Park | G07F 9/023 705/39 |
| 2017/0019402 A1* | 1/2017 | Kulkarni | H04L 63/0807 |
| 2018/0005628 A1* | 1/2018 | Xue | G06F 17/20 |
| 2018/0137865 A1* | 5/2018 | Ling | G10L 15/08 |
| 2018/0218739 A1* | 8/2018 | Park | G06F 21/32 |
| 2018/0232522 A1* | 8/2018 | Shear | H04L 63/0861 |

* cited by examiner

VOICE INPUTTING METHOD, AND ELECTRONIC DEVICE AND SYSTEM FOR SUPPORTING THE SAME

CROSS-REFERENCE TO RELATED APPLICATION

This application is based on and claims priority under 35 U.S.C. § 119 to a Korean patent application filed on Jan. 31, 2017 in the Korean Intellectual Property Office and assigned Serial number 10-2017-0014024, the disclosure of which is incorporated by reference herein in its entirety.

TECHNICAL FIELD

The present disclosure relates generally to a voice inputting method, and an electronic device and a system for supporting the same.

BACKGROUND

In recent years, electronic devices including a microphone may perform a function of purchasing an article or switching on a light based on a voice received through the microphone. For example, the electronic device may perform voice recognition for the received voice input, and when a specific instruction is included in the performance result of the voice recognition, may perform a function corresponding to the instruction.

Meanwhile, the electronic device may perform voiceprint recognition to determine whether the received voice is a voice uttered by an authenticated user. For example, when a function that requires security processing is performed, the electronic device may perform voiceprint recognition as well as voice recognition to identify the user, and performs a function only when the user is an authenticated user to reinforce the security of the performance of the function.

Conventionally, when the electronic device performs a function that requires security processing, it may receive a separate password from the user, or induce the user to additionally utter a voice corresponding to a specific letter row for voiceprint recognition.

SUMMARY

Various example embodiments of the present disclosure provide a voice inputting method, for determining performance of voice recognition for voice data corresponding to a received voice and voiceprint recognition for the voice data, and an electronic device supporting the same.

Further, various example embodiments of the present disclosure may provide a voice inputting method for adjusting a sensitivity of voiceprint recognition based on a security level, and an electronic device supporting the same.

In accordance with an example aspect of the present disclosure, an electronic device includes a microphone configured to receive a voice, communication circuitry comprising communication circuitry configured to communicate with an external electronic device, a memory, and a processor operatively connected to the microphone, the communication circuitry, and the memory. The memory stores instructions that, when executed by the processor, cause the electronic device to perform voice recognition for voice data corresponding to the voice, and to determine whether to perform voiceprint recognition for the voice data based on whether a first expression is included in a performance result of the voice recognition.

In accordance with another example aspect of the present disclosure, a voice inputting method for an electronic device includes acquiring voice data, performing voice recognition on the voice data, determining whether a first expression is included in a performance result of the voice recognition, and determining whether to perform voiceprint recognition for the voice data based on whether the first expression is included in the performance result of the voice recognition.

In accordance with another example aspect of the present disclosure, a system includes a communication interface comprising communication circuitry, a processor electrically connected to the communication interface, and a memory electrically connected to the processor. The memory stores instructions that, when executed by the processor, cause an electronic device including the processor to receive voice data including a request through the communication interface, to convert the voice data to text data, to determine whether the text data includes a selected text, to compare a portion of the voice data corresponding to the selected text with reference voice data stored in the memory if the text data includes the selected text, to process the request if the portion of the voice data coincides with the reference voice data, and to reject the request if the portion of the voice data does not coincide with the reference voice data.

In accordance with another example aspect of the present disclosure, a system includes a microphone, a processor electrically connected to the microphone, and a memory electrically connected to the processor. The memory stores instructions that, when executed by the processor, cause an electronic device to receive voice data including a request through the microphone, to convert the voice data to text data, to determine whether the text data includes a selected text, to compare a portion of the voice data corresponding to the selected text with reference voice data stored in the memory, and to process the request if the portion of the voice data coincides with the reference voice data, and to reject the request if the portion of the voice data does not coincide with the reference voice data.

According to various embodiments of the present disclosure, the electronic device may not require a separate voice acquiring process for voiceprint recognition when a function and a user authentication are performed through a voice.

According to various embodiments of the present disclosure, the electronic device may improve a processing speed for voiceprint recognition and a security function by selectively adjusting the sensitivity of the voiceprint recognition.

In addition, the present disclosure may provide various effects that are directly or indirectly recognized.

BRIEF DESCRIPTION OF THE DRAWINGS

The above and other aspects, features, and attendant advantages of the present disclosure will be more apparent and readily appreciated from the following detailed description taken, in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
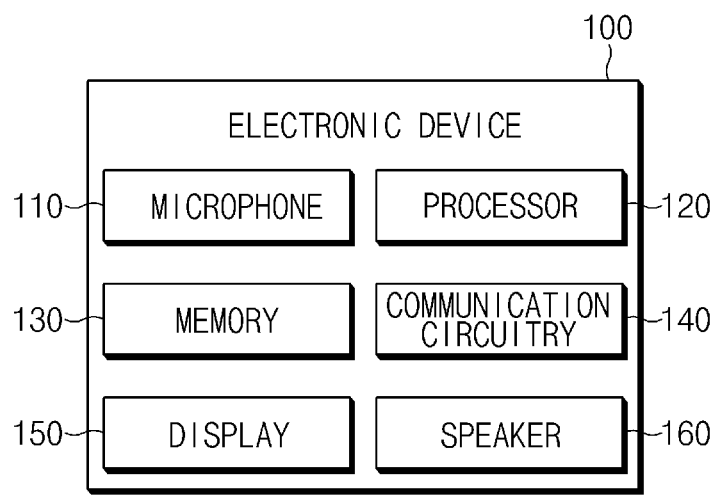
FIG. 1 is a block diagram illustrating an example electronic device related to input of a voice according to an example embodiment of the present disclosure.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may refer, for example, and without limitation, to a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in greater detail with reference to the accompanying drawings. The term "user" used herein may refer to a person who uses an electronic device or may refer to a device (e.g., an artificial intelligence electronic device) that uses an electronic device.

FIG. 1 is a block diagram illustrating an example electronic device related to input of a voice according to an example embodiment of the present disclosure.

The electronic device 100 may perform voice recognition for a received voice input, and when a specific expression (e.g., an instruction) is included in a performance result of the voice recognition, may perform a function corresponding to the specific expression. Further, the electronic device 100 may perform voiceprint recognition to determine whether a received voice is a voice uttered by an authenticated user. The voiceprint recognition may include information obtained by converting the received voice into a spectrum form, and may be used as information for distinguishing a user based on the converted frequency characteristics.

According to an embodiment, the electronic device 100 may perform voiceprint recognition using voice data corresponding to the voice input received once without having to acquire a separate voice for the voiceprint recognition from the user. For example, the electronic device 100 may perform voice recognition for the voice data corresponding to the received voice, and may perform the voiceprint recognition for the voice data when a specific expression is included in the performance result of the voice recognition. Further, the electronic device 100 may determine a security level of the specific expression, and may adjust a sensitivity of the voiceprint recognition based on the security level. Accordingly, the electronic device 100 may allow a function corresponding to the expression to be easily performed, by lowering the sensitivity of the voiceprint recognition when the specific expression is an expression corresponding to a low security level, and may allow user authentication to be thoroughly performed, by increasing the sensitivity of the voiceprint recognition when the specific expression is an expression corresponding to a high security level.

Referring to FIG. 1, the electronic device 100 for performing the above-mentioned function may include a microphone 110, a processor (e.g., including processing circuitry) 120, a memory 130, a communication circuitry 140, a display 150, and a speaker 160. However, the configuration of the electronic device 100 is not limited thereto. According to various embodiments, at least one of the elements of the electronic device 100 may be excluded or at least one other element may be further included.

The microphone 110 may receive a sound introduced from the outside, for example, a voice of the user. One microphone 110 may be disposed in the electronic device 100, and a plurality of microphones 110 may be disposed in the electronic device 100.

The processor 120 may include various processing circuitry and execute calculations or data processing related to the control and/or communication of at least one other element of the electronic device 100. The processor 120, for example, may control a plurality of hardware or software components connected to the processor 120 by driving an operating system or an application program and perform a variety of data processing or calculations. The processor 120 may include various processing circuitry, such as, for example, and without limitation, one or more of a dedicated processor, a central processing unit (CPU), an application processor (AP), or a communication processor (CP), or the like. According to an embodiment, the processor 120 may be implemented by a System on Chip (SoC).

The processor 120 may analyze the voice input received through the microphone 110. According to an embodiment, the processor 120 may perform voice recognition for the received voice input. The processor 120 may analyze the voice data corresponding to the voice input received through the microphone 110, and may convert the voice data to a text form. As an example, when the user utters a voice (e.g., "HI"), the microphone 110 may convert vibrational energy generated by the utterance of the user to an electrical signal, and may deliver the converted electrical signal to the processor 120. Further, the processor 120 may convert the delivered electrical signal to frequency spectrum information corresponding thereto, and may determine letters (e.g., "H" and "I") corresponding to the converted frequency spectrum information by comparing the converted frequency spectrum information with the frequency spectrum information corresponding to various letters stored in the memory 130.

Further, the processor 120 may perform voiceprint recognition for the received voice input. The processor 120 may perform voiceprint recognition in the substantially same way as the voice recognition. However, in the voiceprint recognition, the processor 120 may use frequency spectrum information according to the voice of the user stored in the memory 130. For example, when the user utters "HI", the voice recognition may simply determine the letters (e.g., "H" and "I") included in the voice, but the voiceprint recognition may determine which user uttered "HI".

According to an embodiment, the processor 120 may determine whether the voiceprint recognition for the voice input is to be performed, based on whether a specific expression is included in the voice recognition result for the received voice input. For example, the processor 120 may perform voiceprint recognition for the voice input when the specific expression is included in the performance result of the voice recognition. As an example, when a first expression and a second expression are included in the voice recognition result and the first expression is a specific instruction, the processor 120 may perform voiceprint recognition for the voice input. As another example, when neither the first expression nor the second expression is the specific instruction, the processor 120 may not perform voiceprint recognition for the voice input. In this case, the processor 120 may perform a function corresponding to the first expression or the second expression without performing voiceprint recognition.

According to an embodiment, the processor 120 may determine a security level for a specific expression when the specific expression is included in the voice recognition result. The security level for the specific expression may be stored in the memory 130 in a form, for example, of a table and may be managed. The processor 120 may adjust a sensitivity of voiceprint recognition according to the security level for the specific expression. As an example, the processor 120 may increase the sensitivity of the voiceprint recognition when the security level of the specific expression is high, and may decrease the sensitivity of the voiceprint recognition when the security level of the specific expression is low. The sensitivity of the voiceprint recognition may be differently set based on which level the similarity of the information is to be determined when the frequency spectrum information stored in the memory 130 and the converted frequency spectrum information are compared. For example, the voice recognition may be successful when the similarity of the information is high if the sensitivity of the voiceprint recognition is high, and may be successful even though the similarity of the information is low if the sensitivity of the voiceprint recognition is low.

According to an embodiment, the processor 120 may determine a security level for an object (a target of an instruction) even when the specific expression is the object as well as the instruction, and may adjust the sensitivity of the voiceprint recognition based on the security level of the object. As an example, the process 120 may increase the sensitivity of the voiceprint recognition when the object is a user or a device, whose security level is high. In some embodiments, the processor 120 may increase the sensitivity of the voiceprint recognition when the object is an article purchase target and the price (or monetary value) of the article purchase target is high. On the other hand, the processor 120 may decrease the sensitivity of the voice recognition when the price of the article purchase target is low.

The memory 130 may include a volatile and/or nonvolatile memory. The memory 130, for example, may store a command or data related to at least one other component of the electronic device 100. According to an embodiment, the memory 130 may store software and/or a program. The program may include an application. The application may be a set of programs (or instructions) for performing at least one specific function, and for example, may include a payment application. The memory 130 may include an internal memory or an external memory.

According to an embodiment, the memory 130 may store frequency spectrum information corresponding to various letters. Further, the memory 130 may store frequency spectrum information according to the voice of the user.

The communication circuitry 140 may include various communication circuitry and set communication between the electronic device 100 and an external device. For example, the communication circuitry 140 may be connected to a network through a wireless or wired communication, or the like, to communicate with the external device.

According to an embodiment, the communication circuitry 140 may transmit the voice input received through the microphone 110 to the external electronic device. Further, the communication circuitry 140 may transmit a signal corresponding to a specific expression included in the received voice input to the external electronic device. In some embodiments, the communication circuitry 140 may receive voice data from an external electronic device. For example, the external electronic device having a microphone therein may acquire a voice, and the electronic device 100 may receive the voice acquired from the external electronic device through the communication circuitry 140.

The display 150 may display various contents (e.g., a text, an image, a video, an icon, and a symbol). As an example, if the voice input received through the microphone 110 is converted to a text form by the processor 120, the display 150 may display the converted text on a screen. As another example, when a function corresponding to the specific expression included in the received voice input is performed, the display 150 may display a result for the performance of the function on the screen. According to an embodiment, the display 150 may include a touch screen, and for example, may receive a touch, a gesture, a proximity, or a hovering input using an electronic pen or the user's body.

The speaker 160 may output contents related to state information of the electronic device with a sound. As an example, when the function corresponding to the specific expression included in the voice input received through the microphone 110 is performed, the speaker 160 may output a result for the performance of the function as a sound. For example, the speaker 160 may output a sound corresponding to a success when the performance of the function is successful, and may output a sound corresponding to a failure when the performance of the function fails.

Figure 2:
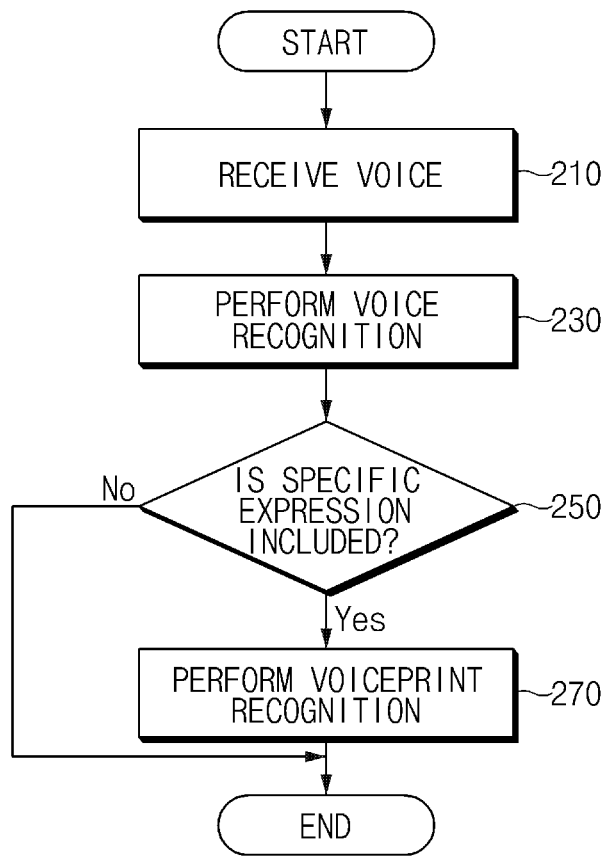
FIG. 2 is a flowchart illustrating an example method for managing an electronic device related to input of a voice according to an example embodiment of the present disclosure.

FIG. 2 is a flowchart illustrating an example method for managing an electronic device related to input of a voice according to an example embodiment of the present disclosure.

The electronic device according to the embodiment may include some or all configurations of the electronic device 100 of FIG. 1.

Referring to FIG. 2, in operation 210, the electronic device (e.g., the electronic device 100) may receive a voice of the user. For example, the electronic device may directly receive a voice of the user through a microphone (e.g., the microphone 110) or may receive voice data of the user received by another external electronic device (e.g., a remote controller or a portable electronic device) through a communication circuit (e.g., the communication circuitry 140). In operation 230, the electronic device (e.g., the processor 120) may perform voice recognition for the received voice. For example, the electronic device (e.g., the processor) may analyze voice data corresponding to the voice received through the microphone, and may convert the voice data to a text form. The electronic device (e.g., the processor) may convert vibrational energy generated through utterance of the user to an electrical signal based on the microphone, and may convert the converted electrical signal to frequency spectrum information corresponding thereto. The processor may compare the converted frequency spectrum information with the frequency spectrum information corresponding to various letters stored in a memory (e.g., the memory 150) to determine the letters corresponding to the converted frequency spectrum information.

In operation 250, the electronic device (e.g., the processor) may determine whether a specific expression is included in the performance result of the voice recognition. According to an embodiment, the electronic device may determine whether the specific expression is one of the expressions stored in the memory in advance. In this regard, the expressions stored in the memory in advance may include at least some of the instructions corresponding to the functions that may be performed by the electronic device. As an example, when the electronic device is an electronic device that may perform a function related to payment, the instructions (e.g., "Order" or "Buy") related to the payment function may be stored in the memory.

When the specific expression is included in the performance result of the voice recognition, in operation 270, the electronic device (e.g., the processor) may perform voiceprint recognition for the voice. For example, the processor may determine whether the voice is a voice uttered by the authenticated user. According to an embodiment, the electronic device (e.g., the processor) may analyze voice data corresponding to the voice received through the microphone, and may convert the voice data to a text form. The electronic device (e.g., the processor) may convert vibrational energy generated through the utterance of the user to an electrical signal based on the microphone, may convert the converted electrical signal to frequency spectrum information corresponding thereto, and may compare the converted frequency spectrum information with the frequency spectrum information according to the voice of the user stored in the memory to identify the user. According to an embodiment, the electronic device (e.g., the processor) may compare frequency spectrum information corresponding to the specific expression with the frequency spectrum information according to the voice of the user stored in the memory. In some embodiments, the electronic device (e.g., the processor) may perform voiceprint recognition by using the frequency spectrum information obtaining through the performance result of the voice recognition. For example, the processor may compare the frequency spectrum information converted through the performance result of the voice recognition with the frequency spectrum information according to the voice of the user to identify the user. If the specific expression is not included in the performance result of operation 250, the voiceprint recognition is not performed.

Figure 3:
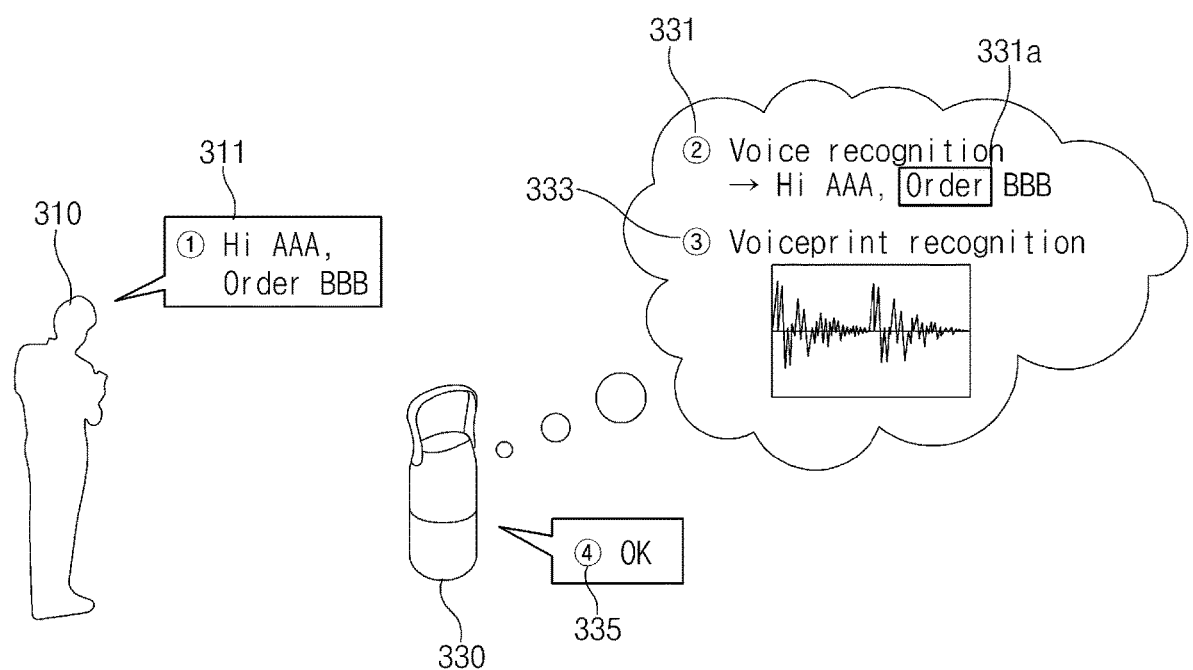
FIG. 3 is a diagram illustrating example input of a voice according to an example embodiment of the present disclosure.

FIG. 3 is a diagram illustrating example input of a voice according to an example embodiment of the present disclosure.

The electronic device 330 according to the embodiment may include some or all configurations of the electronic device 100 of FIG. 1.

Referring to FIG. 3, in operation 311, if the user 310 utters a voice (e.g., "Hi AAA, Order BBB") such that a specific expression 331a (e.g., "Order") is included in the uttered voice, the electronic device 330 may receive the voice through a microphone (e.g., the microphone 110). Further, as in operation 331, the electronic device may perform voice recognition for the received voice. For example, the electronic device (e.g., the processor 120) may analyze voice data corresponding to the received voice, and may convert the voice data to a text form.

According to an embodiment, the electronic device (e.g., the processor 120) may determine whether the voiceprint recognition for the voice is to be performed, based on whether an expression that is designated to determine whether the voiceprint recognition is to be performed is included in the voice data converted to a text form. As an example, when an instruction 331a (e.g., "Order") corresponding to a function that requires voiceprint recognition for security is uttered by the user 310, in operation 333, the electronic device may perform voiceprint recognition for a part of the voice data corresponding to the function that requires the voiceprint recognition to determine whether the user 310 is an authenticated user.

As a result of the performance of the voiceprint recognition, the electronic device may perform the function if the user 310 is determined to be an authenticated user. Further, in operation 335, the electronic device may provide the result of the performance of the function to the user. As an example, the electronic device (e.g., the processor 120) may output the result of the performance of the function on a display (e.g., the display 150). As another example, the electronic device (e.g., the processor 120) may output the result of the performance of the function through a speaker (e.g., the speaker 160).

According to the performance of the above-mentioned operations, the electronic device may determine various situations and the types of the instructions to selectively provide an authentication system of the user 310. For example, the electronic device may authenticate the user 310 through the voiceprint recognition only in a necessary situation (e.g., when a voice including a specific expression is uttered). Accordingly, the electronic device may shorten a processing speed for the voice input. Further, because the electronic device performs user authentication through an authentication server or the like only in a situation, such as purchase of an article or change of an article purchase target, in which the user authentication is necessary, costs for processing a local device (e.g., an electronic device) and a server may be saved.

Figure 4:
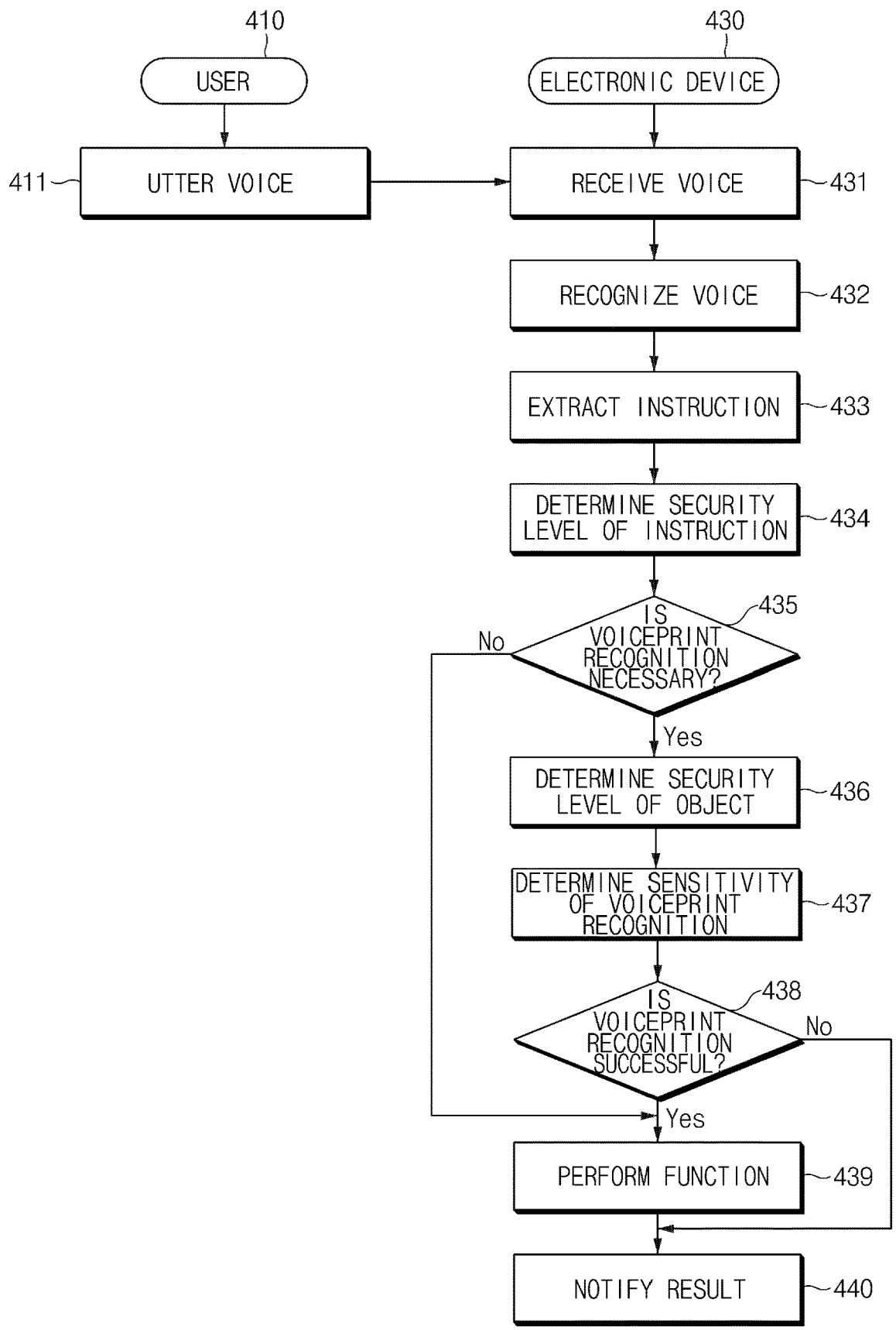
FIG. 4 is a flowchart illustrating an example method for adjusting a sensitivity of voice print recognition according to an example embodiment of the present disclosure.

FIG. 4 is a flowchart illustrating an example method for adjusting a sensitivity of voice print recognition according to an example embodiment of the present disclosure.

The electronic device 430 according to the embodiment may include some or all configurations of the electronic device 100 of FIG. 1.

Referring to FIG. 4, if the user 410 utters a voice in operation 411, the electronic device 430 (e.g., the electronic device 100) may receive the voice through a microphone (e.g., the microphone 110) in operation 431. Further, in operation 432, the electronic device 430 (e.g., the processor 120) may perform voice recognition for the voice. For example, the processor 120 may analyze voice data corresponding to the received voice, and may convert the voice data to a text form. In some embodiments, the electronic device 430 may receive voice data from an external electronic device through a communication circuit (e.g., the communication circuitry 140) or may receive data obtained by converting voice data to a text form. For example, the electronic device 430 may receive voice data from an external electronic device through a communication circuit and convert the received voice data to a text form, or may receive voice data converted by the external electronic device.

In operation 433, the electronic device 430 (e.g., the processor 120) may extract an instruction from the voice data. As an example, the processor 120 may classify the expressions included in the voice data converted to a text form according to the kinds of the expressions, and may extract an instruction from the expressions. In this regard, the electronic device 430 (e.g., the processor 120) may classify the expressions to instructions or objects. As an example, the electronic device 430 may store an instruction corresponding to the function that may be performed, an object associated with the instruction, and the like in a memory (e.g., the memory 130) and manage them.

If the instruction is extracted, in operation 434, the electronic device 430 (e.g., the processor 120) may determine a security level of the instruction. According to an example, the electronic device 430 may store information on the security level of the instruction in the memory and may manage the information. The security level of the instruction, for example, may be differently set based on a degree at which the user authentication is necessary. As an example, in the case of an instruction that is set to perform a function that requires user authentication, for example, to purchase an article or delete important information, the electronic device 430 may set the security level of the instruction to be higher. In some embodiments, the security level of the instruction may be set through selection of the user. For example, the electronic device 430 may provide a screen that may set the security level of the instruction to the user through a display (e.g., the display 150), and the user may set or change the security level of the instruction through the screen. In some embodiments, when the information on the security level of the instruction is not stored in the memory, the electronic device 430 may identify whether the information on the security level of another instruction that is similar to the instruction is stored in the memory. When the information on the security level of the other instruction is stored in the memory, the electronic device 430 may determine the security level of the instruction based on the security level of the other instruction.

In operation 435, the electronic device 430 (e.g., the processor 120) may determine whether the voiceprint recognition for the voice is necessary according to the security level of the instruction. As an example, the electronic device 430 may prepare for performance of the voiceprint recognition for the voice only when the security level of the instruction is a specific value or more.

When it is determined that the voiceprint recognition is necessary (e.g., when the security level of the instruction is a specific value or more), in operation 436, the electronic device 430 (e.g., the processor 120) may extract an object from the expressions included in the voice data and may determine the security level of the object. The information of the security level of the object also may be stored in the memory and may be managed. As an example, the security level of the object may be stored in the memory to be managed in a form such as a table together with the security level of the instruction. According to an embodiment, the security level of the object may be differently set based on a correlation with the instruction and the type of the object. As an example, when the object is a user (or a device), the security level of the user (or the device) may be the security level of the object. As another example, when the object is an article purchase target, the security level of the object may be differently set based on the price of the article purchase target. For example, as the total sum of the prices of the article purchase targets increases and/or the number of purchases increases, the security level of the object may increase.

In operation 437, the electronic device 430 (e.g., the processor 120) may determine the sensitivity of the voiceprint recognition for the voice. According to an embodiment, the electronic device 430 may determine the sensitivity of the voiceprint recognition based on at least one of the security level of the instruction and the security level of the object. The sensitivity of the voiceprint recognition may be an index for determining to which level the similarity of the information is set when the frequency spectrum information stored in the memory and the frequency spectrum information converted during the performance of the voiceprint recognition are compared. If at least one of the security level of the instruction and the security level of the object is higher, the sensitivity of the voiceprint recognition may become higher.

The electronic device 430 (e.g., the processor 120) may perform the voiceprint recognition based on the determined sensitivity. According to an embodiment, when the sensitivity of the voiceprint recognition is high, the electronic device 430 may determine that the voiceprint recognition is successful only when the similarity of the information (e.g., the frequency spectrum information stored in the memory and the frequency spectrum information converted during the performance of the voiceprint recognition) is high. Further, when the sensitivity of the voiceprint recognition is high, the electronic device 430 may analyze the voiceprint through a server or the like to increase the accuracy of the voiceprint recognition. According to an embodiment, when the sensitivity of the voice recognition is low, the electronic device 430 may determine that the voiceprint recognition is successful even through the similarity of the information is low. Further, when the sensitivity of the voiceprint recognition is low, the electronic device 430 may shorten the processing time for the voiceprint recognition because the voiceprint recognition may not be performed through the server or the like.

In operation 438, the electronic device 430 (e.g., the processor 120) may determine whether the voiceprint recognition is successful. For example, the electronic device 430 may determine whether the similarity of the information (e.g., the frequency spectrum information stored in the memory and the frequency spectrum information converted during the performance of the voiceprint recognition is a specific value or more.

After the performance of the voiceprint recognition, when the voiceprint recognition is successful (e.g., when the similarity of the information is a specific value or more), that is, if the voice is determined to be a voice uttered by the user, in operation 439, the electronic device 430 may perform a function corresponding to the instruction and the object. Further, in operation 440, the electronic device 430 may inform the user 410 of the result for the performance of the function. Further, when the voiceprint recognition fails (e.g., when the similarity of the information is less than a specific value), that is, if it is determined that the voice is not a voice uttered by an authenticated user, the electronic device 430 may omit the performance of operation 439, and in operation 440, may inform the user 410 that the voiceprint recognition failed. In some embodiments, in operation 439, the electronic device 430 may perform different functions according to authorities set for respective users. For example, an authority to set a sum that may be paid, an authority to release a lock (of a safe or the like), an authority to watch a TV channel or the like may be set for respective users, and different functions may be performed according to the set authorities.

After the performance of operation 435, when it is determined that the voiceprint recognition is not necessary (e.g., when the security level of the instruction is less than a specific value), the electronic device 430 may omit the performance of operations 436 to 438 and may perform operation 439. For example, the electronic device 430 (e.g., the processor 120) may perform a function corresponding to the instruction and the object without performing the voiceprint recognition for the voice.

According to the performance of the above-mentioned operations, the electronic device 430 may improve a stability for the performance of the function and also improve usability by organically adjusting the sensitivity of the voiceprint recognition according to a situation.

Figure 5:
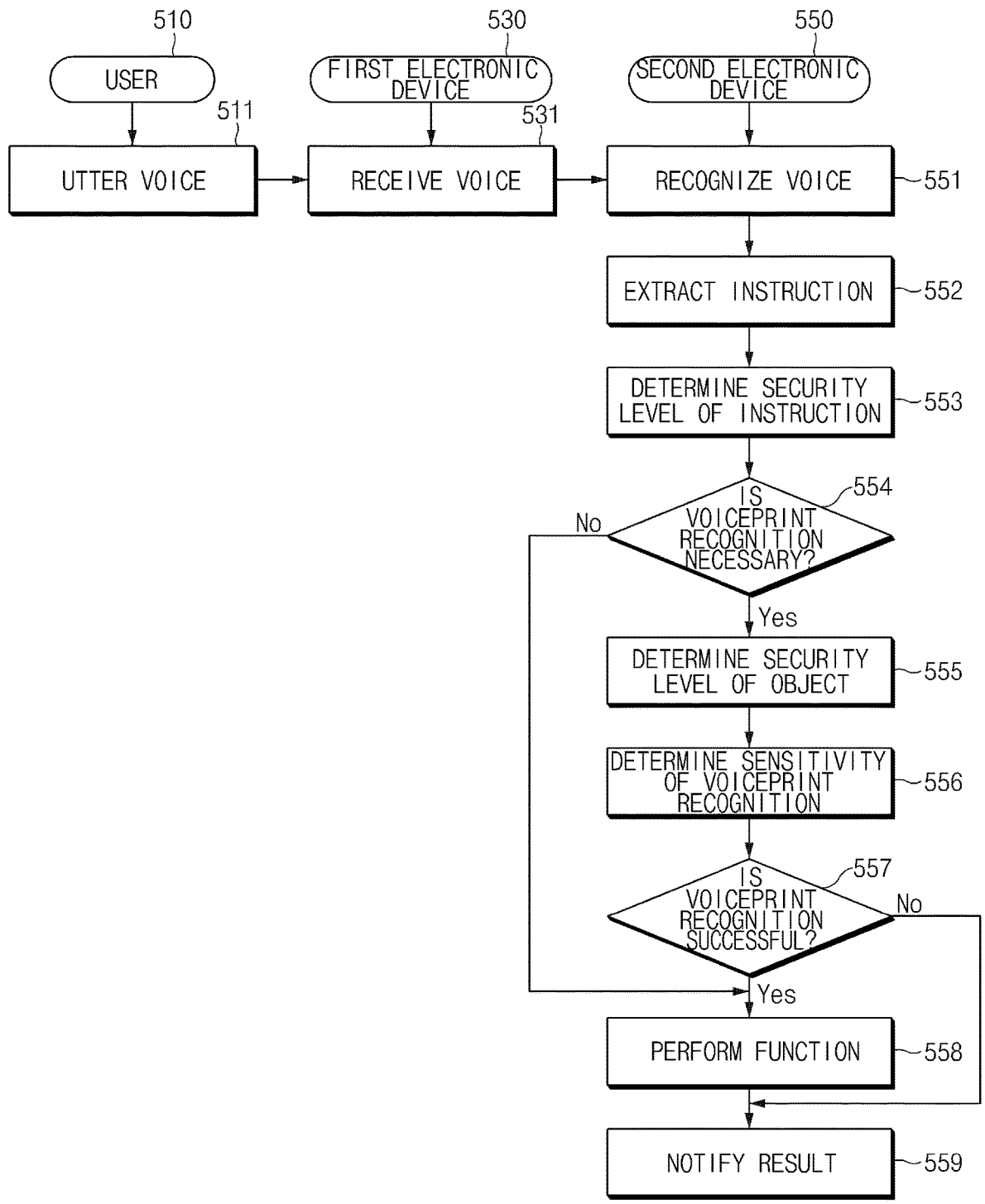
FIG. 5 is a flowchart illustrating an example method for managing a system related to input of a voice according to an example embodiment of the present disclosure

FIG. 5 is a flowchart illustrating an example method for managing a system related to input of a voice according to an example embodiment of the present disclosure.

A first electronic device 530 and a second electronic device 550 according to an embodiment may include some or all configurations of the electronic device 100 of FIG. 1. In some embodiments, the first electronic device 530 may include a microphone 110, a processor 120, a memory 130, or communication circuitry 140 of the elements of the electronic device 100 illustrated in FIG. 1, and the second electronic device 550 may include a processor 120, a memory 130, communication circuitry 140, a display 150, or a speaker 160. However, the configurations of the first electronic device 530 and the second electronic device 550 are not limited thereto. According to various embodiments, the first electronic device 530 and the second electronic device 550 may include substantially the same elements. However, the operations related to input of a voice described in FIG. 4 may be performed selectively or in a distributed way according to the elements included in the first electronic device 530 and the second electronic device 550 in FIG. 5.

Referring to FIG. 5, according to an embodiment, the voice recognition and/or the voiceprint recognition may be performed through an external electronic device (e.g., the second electronic device 550) instead of an electronic device (e.g., the first electronic device 530). According to an embodiment, if the user 510 utters a voice in operation 511, the first electronic device 530 may receive a voice of the user 510 through a microphone (e.g., the microphone 110) and may deliver the received voice to the second electronic device 550 (e.g., a server).

In operation 551, the second electronic device 550 receives a voice from the first electronic device 530 through a communication circuit (e.g., the communication circuitry 140), and performs voice recognition for the received voice. For example, the second electronic device 550 (e.g., the processor 120) may analyze voice data corresponding to the received voice, and may convert the voice data to a text form.

In operation 552, the second electronic device 550 (e.g., the processor 120) may extract an instruction from the voice data. If the instruction is extracted, in operation 553, the second electronic device 550 (e.g., the processor 120) may determine a security level of the instruction.

Further, in operation 554, the second electronic device 550 (e.g., the processor 120) may determine whether the voiceprint recognition for the voice is necessary based on the security level of the instruction. For example, the second electronic device 550 may prepare for performance of the voiceprint recognition for the voice only when the security level of the instruction is a specific value or more.

When it is determined that the voiceprint recognition is necessary (e.g., when the security level of the instruction is a specific value or more), in operation 555, the second electronic device 550 (e.g., the processor 120) may extract an object from the voice data and may determine the security level of the object.

In operation 556, the second electronic device 550 (e.g., the processor 120) may determine the sensitivity of the voiceprint recognition for the voice. As an example, the second electronic device 550 may determine the sensitivity of the voiceprint recognition based on at least one of the security level of the instruction and the security level of the object.

The second electronic device 550 (e.g., the processor 120) may perform the voiceprint recognition based on the determined sensitivity. In operation 557, the second electronic device 550 (e.g., the processor 120) may determine whether the voiceprint recognition is successful. For example, the second electronic device 550 may determine whether the similarity of the information (e.g., the frequency spectrum information stored in the memory and the frequency spectrum information converted during the performance of the voiceprint recognition is a specific value or more.

After the performance of the voiceprint recognition, when the voiceprint recognition is successful (e.g., when the similarity of the information is a specific value or more), that is, if the voice is determined to be a voice uttered by the user, in operation 558, the second electronic device 550 (e.g., the processor 120) may perform a function corresponding to the instruction and the object. Further, in operation 559, the second electronic device 550 (e.g., the processor 120) may inform the user 510 or the first electronic device 530 of the result for the performance of the function. Further, when the voiceprint recognition fails (e.g., when the similarity of the information is less than a specific value), that is, if it is determined that the voice is not a voice uttered by an authenticated user, the second electronic device 550 (e.g., the processor 120) may omit the performance of operation 558, and in operation 559, may inform the user 510 or the first electronic device 530 that the voiceprint recognition failed.

After the performance of operation 554, when it is determined that the voiceprint recognition is not necessary (e.g., when the security level of the instruction is less than a specific value), the second electronic device 550 (e.g., the processor 120) may omit the performance of operations 555 to 557 and may perform operation 558. For example, the second electronic device 550 may perform a function corresponding to the instruction and the object without performing the voiceprint recognition for the voice.

In some embodiments, at least one of operations 551 to 558 may be performed by the first electronic device 530. As an example, the second electronic device 550 may perform operations (e.g., operations 551 to 557) from the voice recognition to the voiceprint recognition, and if the performance result is delivered to the first electronic device 530, the first electronic device 530 may perform operation 558 according to the performance result.

Figure 6:
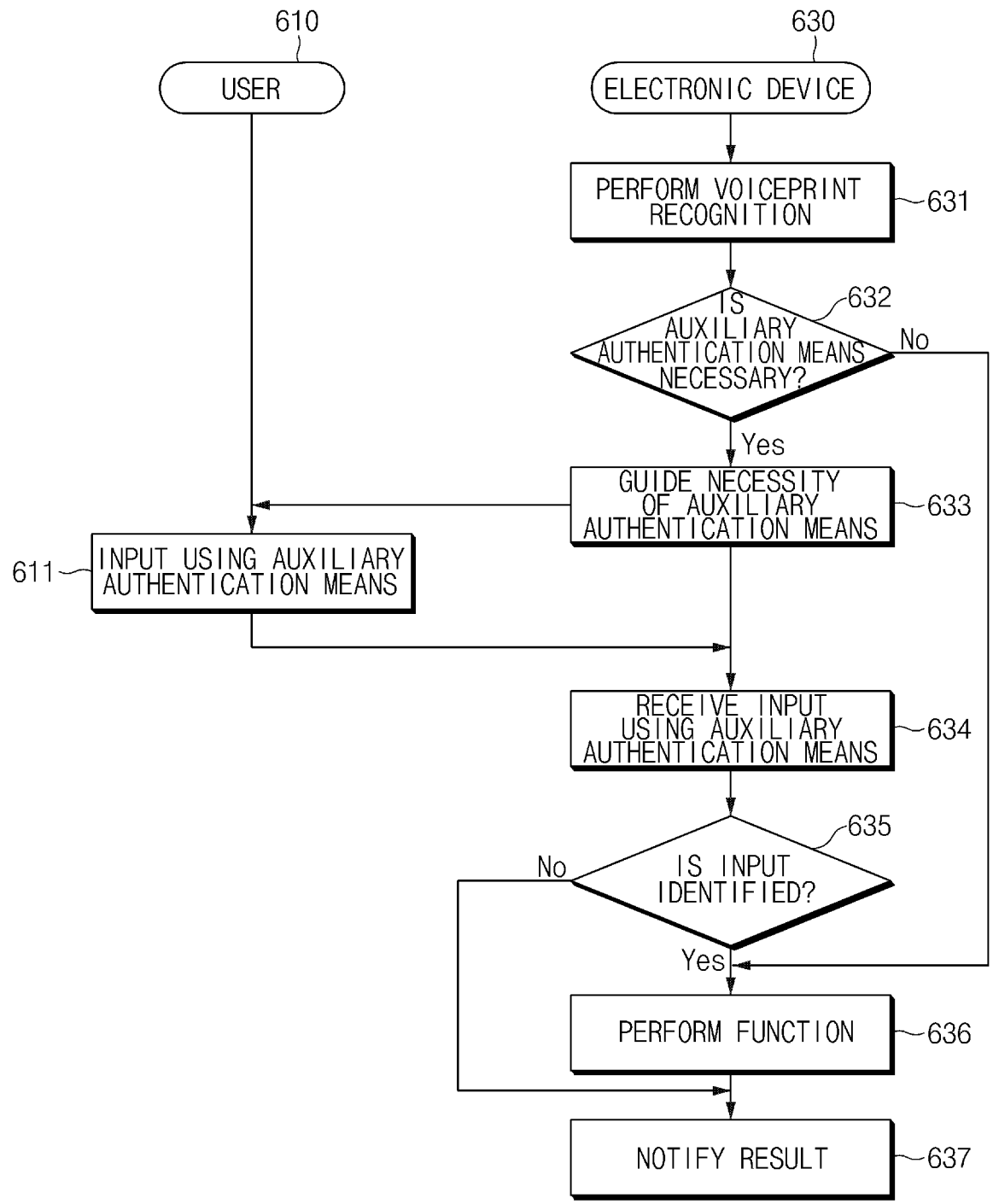
FIG. 6 is a flowchart illustrating an example method for performing user authentication through an auxiliary authentication means according to an example embodiment of the present disclosure.

FIG. 6 is a flowchart illustrating an example method for performing user authentication through an auxiliary authentication means according to an example embodiment of the present disclosure.

The electronic device 630 according to the embodiment may include some or all configurations of the electronic device 100 of FIG. 1.

Referring to FIG. 6, the electronic device 630 according to an embodiment may increase an accuracy of user authentication or change or adjust an authority of the user 610 by additionally authenticating the user 610 through the auxiliary authentication means. For example, when the authority of the user 610 who may use the function of the electronic device 630 is low, the electronic device 630 may temporarily or permanently adjust the authority of the user 610 through the auxiliary authentication means.

According to an embodiment, in operation 631, the electronic device 630 (e.g., the processor 120) may perform voiceprint recognition for a voice uttered by the user 610 in the same or similar way as the voiceprint recognition operation of FIG. 4 or FIG. 5. Further, the electronic device 630 (e.g., the processor 120) may determine whether an additional user authentication operation is required, based on the performance result of the voiceprint recognition. For example, the electronic device 630 may determine whether an auxiliary authentication means, such as, for example, and without limitation, fingerprint recognition, iris recognition, or password input, or the like, is required.

According to an embodiment, the electronic device 630 (e.g., the processor 120) may determine that an auxiliary authentication means for authenticating the user 610 is required when the voiceprint recognition for the voice fails. For example, after the performance of the voiceprint recognition, when the similarity of the frequency spectrum information stored in a memory (e.g., the memory 130) and the frequency spectrum information converted during performance of the voiceprint recognition for the voice is a specific value (e.g., a first value) or less, the electronic device 630 may determine that an auxiliary authentication means for authentication is required. In some embodiments, when the similarity of the information (e.g., the frequency spectrum information stored in the memory and the frequency spectrum information converted during the performance of the voiceprint recognition) is a specific value (e.g., a second value) or less even though the voiceprint recognition for the voice is successful, the electronic device 630 (e.g., the processor 120) may determine that an auxiliary authentication means is required. For example, when the similarity is more than the first value and not more than the second value, the electronic device 630 may determine that an auxiliary authentication means is required. As another example, the electronic device 630 (e.g., the processor 120) may determine that an auxiliary authentication means is required when the security level of the function that is to be performed is high regardless of the performance result of the voiceprint recognition.

When it is determined that an auxiliary authentication means is required, in operation 633, the electronic device 630 may provide a guide notifying that an auxiliary authentication means is required to the user 610. As an example, the electronic device 630 (e.g., the processor 120) may display a display object of contents notifying that an auxiliary authentication means is required through a display (e.g., the display 150), and may output a voice notifying that an auxiliary authentication means is required through a speaker (e.g., the speaker 160).

In operation 611, if identifying that guide notifying that the auxiliary authentication means is required, the user may input using an auxiliary authentication means. As an example, the user 610 may, for example, and without limitation, touch a fingerprint recognition sensor with a finger, may adjust an eye to an iris recognition sensor, and may input a password through a touch screen (e.g., the display 150), or the like.

If the user 610 inputs using the auxiliary authentication means, in operation 634, the electronic device 630 may receive input using the auxiliary authentication means. Further, in operation 635, the electronic device 630 may identify the input using auxiliary input means. As an example, the electronic device 630 (e.g., the processor 120) may identify (determine) whether the fingerprint information, the iris information, or the password that has been input is information related to the authenticated user.

If the identification of the auxiliary input means is completed (or successful), in operation 636, the electronic device 630 may perform a specific function. For example, the electronic device 630 (e.g., the processor 120) may control at least some functions of the electronic device 630 to perform a function corresponding to an instruction included in the voice. Further, in operation 637, the electronic device 630 may inform the user 610 of the result for the performance of the function. Further, if the identification of the input using the auxiliary input means is not completed (or fails), the electronic device 630 may omit performance of operation 636 and, in operation 637, may notify the user that the identification of the input using the auxiliary input means failed. For example, the electronic device 630 (e.g., the processor 120) may notify the user that the identification of the input using the auxiliary input means failed through a speaker (e.g., the speaker 160) or the display 150.

Figure 7:
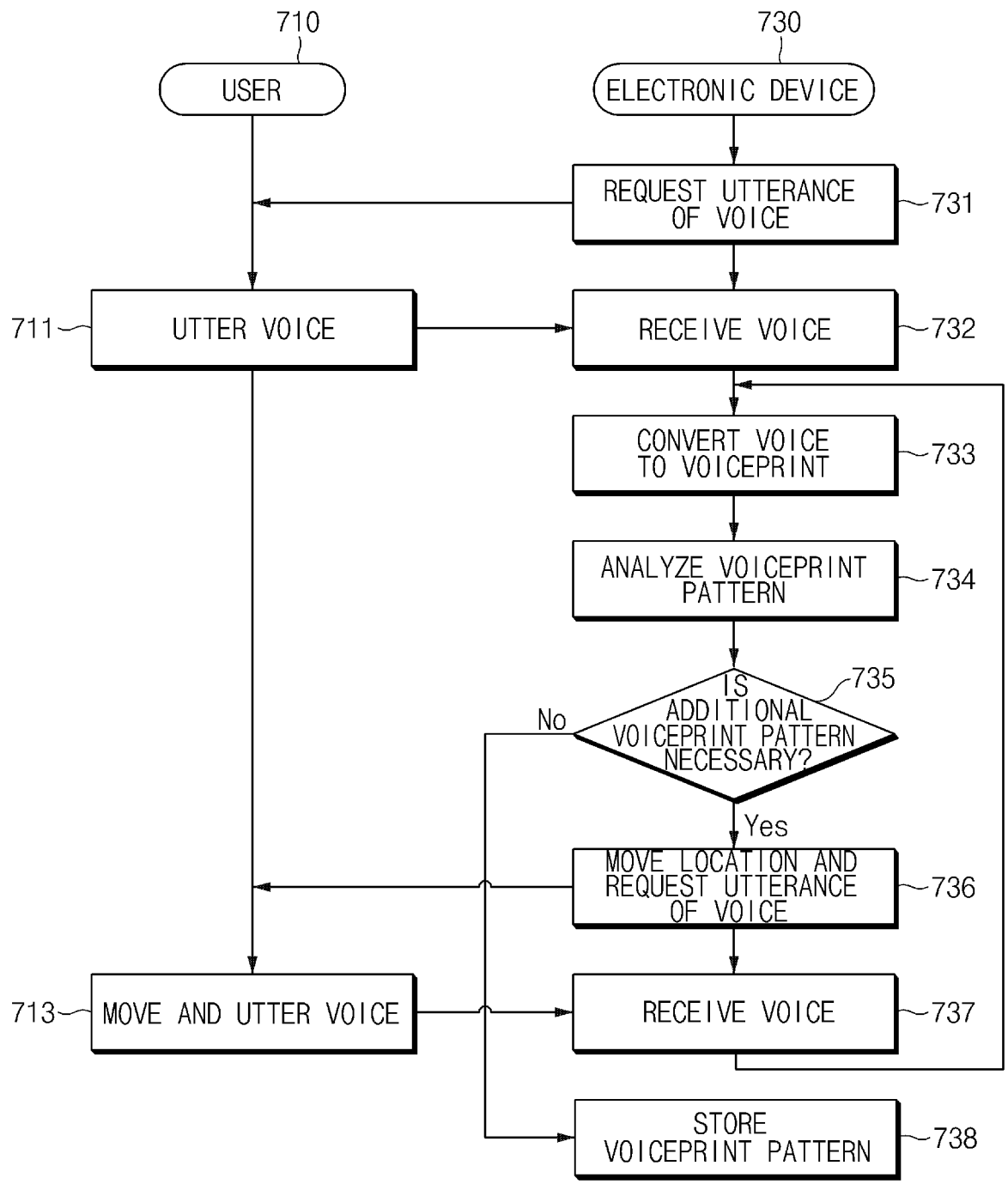
FIG. 7 is a flowchart illustrating an example method for managing an electronic device for learning a voiceprint of the user according to an example embodiment of the present disclosure.

FIG. 7 is a diagram illustrating an example method for managing an electronic device for learning a voiceprint of the user according to an example embodiment of the present disclosure.

The electronic device 730 according to the embodiment may include some or all configurations of the electronic device 100 of FIG. 1.

According to an embodiment, the electronic device 730 may need to learn a voiceprint of the user 710 for voiceprint authentication. For example, the electronic device 730 may store a voiceprint pattern of the user 710 in a memory (e.g., the memory 130). As more various voiceprint patterns that are necessary for the voiceprint authentication are provided, the accuracy of the voiceprint recognition increases. Accordingly, the electronic device 730 may induce the user to change an utterance point in an operation of learning a voiceprint of the user 710. For example, because recognition rate may vary according to surrounding noise and an utterance point of the user 710, the electronic device 730 may induce the user 710 to change an utterance point.

Referring to FIG. 7, in operation 731, the electronic device 730 may request the user to utter a voice. As an example, the electronic device 730 (e.g., the processor 120) may display a display object of contents (e.g., contents to guide the user to utter an expression for distinguishing the user 710 or an expression related to security authentication) requesting utterance of a voice through a display (e.g., the display 150), and may output a voice requesting utterance of a voice through a speaker (e.g., the speaker 160).

If identifying the request for utterance of a voice, in operation 711, the user 710 may utter a voice at a first location.

In operation 732, the electronic device 730 may receive a voice uttered at the first location. For example, the electronic device 730 (e.g., the processor 120) may receive a voice uttered by the user 710 through a microphone (e.g., the microphone 110) or a communication circuit (e.g., the communication circuitry 140). In operation 733, the electronic device 730 (e.g., the processor 120) may convert the received voice to a voiceprint. The voice print may include information obtained by converting the received voice to a frequency spectrum form.

In operation 734, the electronic device 730 (e.g., the processor 120) may analyze a pattern for the voiceprint. Further, in operation 735, the electronic device 730 (e.g., the processor 120) may determine whether an additional voiceprint pattern is necessary. As an example, the electronic device 730 (e.g., the processor 120) may recognize a retention degree of frequency spectrum information corresponding to letters that may be uttered by the user 730, and when the retention degree is a specific value or less, may determine that an additional voiceprint pattern is necessary.

When an additional voiceprint pattern is necessary, in operation 736, the electronic device 730 may request movement of a location and utterance of a voice from the user 710. For example, the electronic device 730 (e.g., the processor 120) may display a display object of contents requesting the user 710 to move from the first location to the second location and utter a voice through a display (e.g., the display 150) or output a voice object through a speaker (e.g., the speaker 160).

If identifying the request, in operation 713, the user 710 may move to the second location and utter a voice. As an example, in operation 713, the user 710 may utter an utterance inducing expression that is output by the electronic device 730 through a display or a speaker. The utterance inducing expression, for example, may include an expression for distinguishing the user 710 or an expression related to security authentication.

In operation 737, the electronic device 730 may receive a voice uttered at the second location. For example, the electronic device 730 (e.g., the processor 120) may receive a voice uttered by the user 710 through a microphone or a communication circuit. The electronic device 730 (e.g., the processor 120) may return to operation 733 to convert the received voice to a voiceprint, and in operation 734, may analyze a pattern for the voiceprint. Thereafter, in operation 735, the electronic device 730 (e.g., the processor 120) may determine whether an additional voiceprint pattern is necessary, and when an additional voiceprint pattern is not necessary, may store the voiceprint pattern in a memory (e.g., the memory 130) in operation 738. In some embodiments, operation 738 may be performed after the performance of operation 734. For example, the electronic device 730 (e.g., the processor 120) may analyze the voiceprint pattern, and may store the analyzed information and the voiceprint pattern in the memory.

Figure 8:
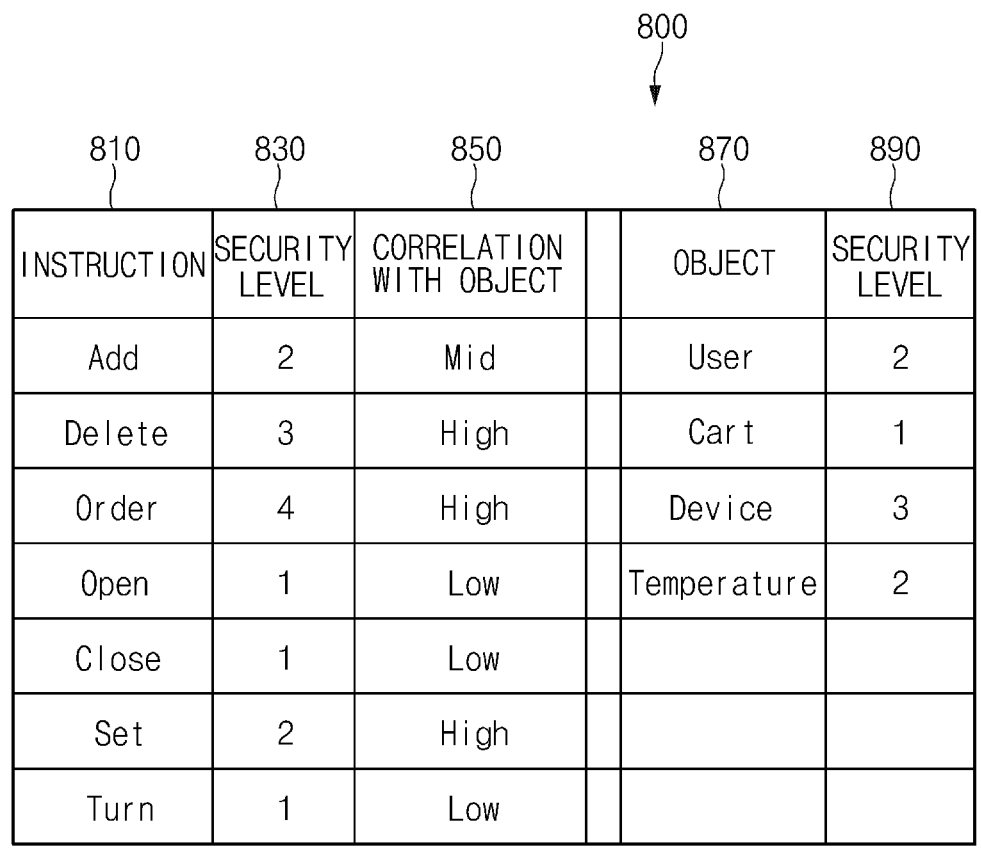
FIG. 8 is a table illustrating a database of example security levels for a specific expression according to an example embodiment of the present disclosure.

FIG. 8 is a table illustrating a database of example security levels for a specific expression according to an example embodiment of the present disclosure.

Referring to FIG. 8, according to an embodiment, information on an instruction corresponding to a function that may be performed by the electronic device (e.g., the electronic device 100) and an object mapped with the instruction may be managed through a database 800 (e.g., the memory 130). The drawing illustrates a state in which information managed through the database 800 is summarized in the form of a table.

The database 800, for example, may include a type 810 of an instruction corresponding to a function that may be performed by the electronic device, a security level 830 of the instruction, a correlation 850 with an object, a type 870 of the object, and a security level 890 of the object. However, the information stored in the database 800 is not limited thereto.

The type 810 of the instruction, for example, may include an instruction (e.g., close or open) for controlling an external electronic device, an instruction (e.g., add, delete, set, or turn) for changing setting, or an instruction (e.g., order) that requires payment.

The security level 830 of the instruction may be differently set based on a degree at which the user authentication is necessary. As an example, in the case of an instruction that is set to perform a function that requires user authentication, for example, to order an article or delete important information, the security level may be set to be high.

The correlation 850 with the object may be set based on the type 810 of the instruction. For example, when a function may be performed only with an instruction, the correlation 850 with the object may be low, and when an instruction cannot be performed without an object, the correlation 850 with the object may be high.

The type 870 of the object, for example, may include, for example, and without limitation, a user, a cart, a device, or a temperature, or the like.

The security level 890 of the object may be differently set based on the correlation with the instruction and the type 870 of the object. As an example, when the object is a user (or a device), the security level of the user (or the device) may be the security level of the object. As another example, when the object is an article purchase target, the security level of the object may be differently set according to the price of the article purchase target. For example, as the total sum of the prices of the article purchase targets increases, the security level of the object may increase. The correlation with the object may correspond to the correlation 850 with the object.

According to an embodiment, the type 810 of the instruction may be grouped and managed based on whether the user authentication is necessary. For example, an instruction, such as addition of a user account, deletion of a user account, an online order, addition of a device, or opening of a door lock, which requires user authentication, may be grouped and managed.

According to an embodiment, the security level 830 of the instruction and the security level 890 of the object may be designated in advance by the user through a setting menu, and the processor (e.g., the processor 120) may determine that additional user authentication is necessary by determining that the instruction and the object are an instruction and an object that require user authentication. In some embodiments, when a specific expression, for example, an expression related to a privacy of the user is uttered together with the instruction and the object, the security level 830 of the instruction and the security level 890 of the object may be changed to be higher. Accordingly, when the corresponding instruction and the corresponding object are included in the voice uttered later, user authentication may be performed according to the changed security level.

According to an embodiment, the security levels of the instructions may be differently set for the respective types 810 of the instructions and for the respective users. Further, the electronic device may have a plurality of tables for respective users (accounts).

Figure 9:
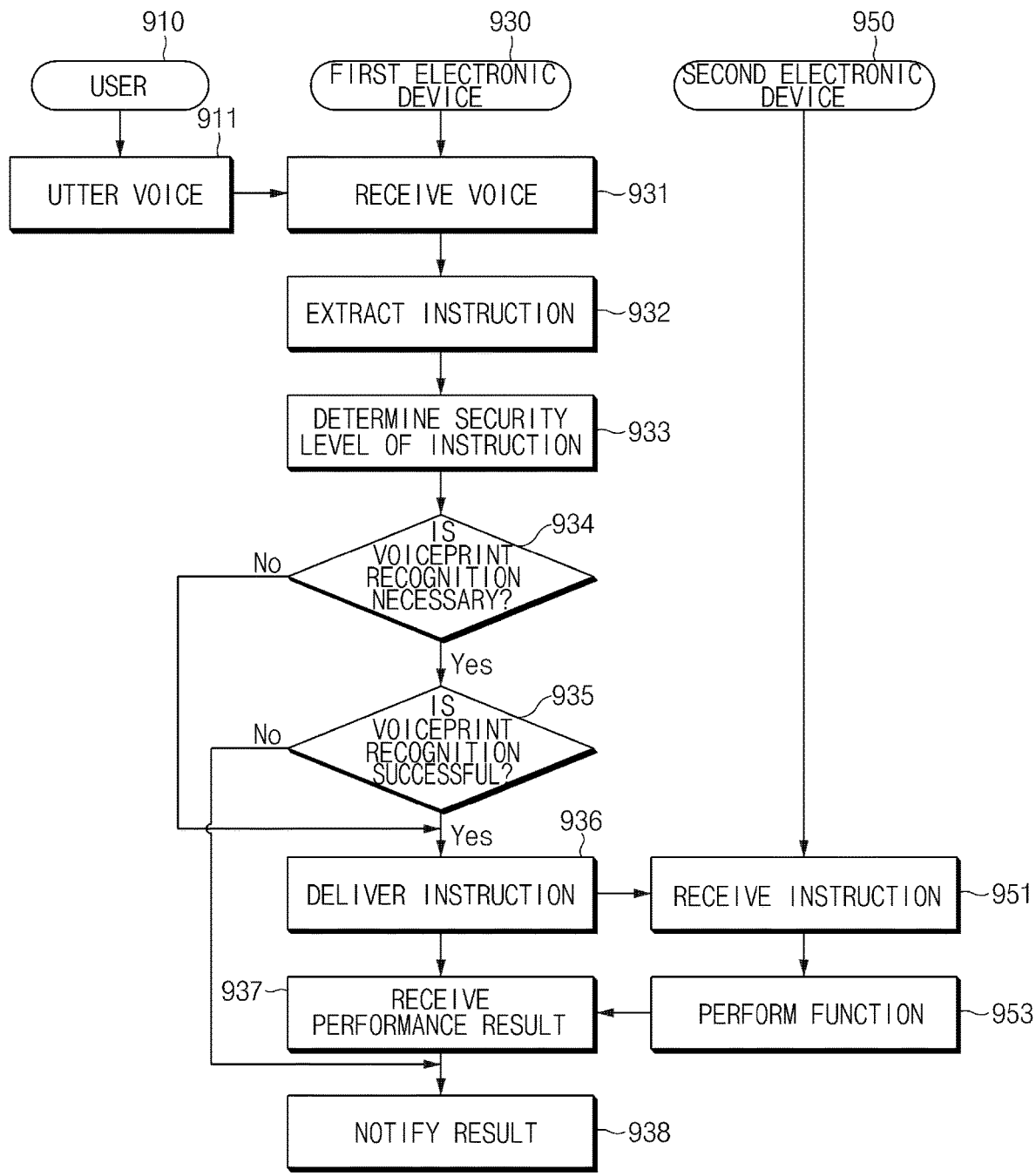
FIG. 9 is a flowchart illustrating an example method for performing a specific function through input of a voice according to an example embodiment of the present disclosure.

FIG. 9 is a flowchart illustrating an example method for performing a specific function through input of a voice according to an example embodiment of the present disclosure.

A first electronic device 930 and a second electronic device 950 according to an embodiment may include some or all configurations of the electronic device 100 of FIG. 1.

Referring to FIG. 9, according to an embodiment, an electronic device 950 that performs a specific function based on utterance of a voice of the user 910 may be separately present from an electronic device 930 that receives the voice and performs voice recognition and/or voiceprint recognition.

According to an embodiment, when the second electronic device 950 that performs a function and/or the first electronic device 930 that performs voice recognition are separately present, the second electronic device 950 may not include a microphone and may simply perform a function corresponding to the delivered instruction (and the object). For example, the first electronic device 930 that receives a voice and analyzes the received voice performs a function of a hub, and the second electronic device 950 connected to the hub may receive a request for performance of a function corresponding to the instruction (and the object) from the first electronic device 930 and perform the corresponding function.

In operation 911, if the user 910 utters a voice, the first electronic device 930 may receive the voice through the microphone (e.g., the microphone 110) in operation 931. The first electronic device 930 (e.g., the processor 120) may extract an instruction from the voice data corresponding to the voice in operation 932, and may determine the security level of the instruction in operation 933.

In operation 934, the first electronic device 930 (e.g., the processor 120) may determine whether the voiceprint recognition for the voice is necessary based on the security level of the instruction. For example, the first electronic device 930 (e.g., the processor 120) may determine that voiceprint recognition is necessary when the security level of the instruction is a threshold value or more (e.g., a security level of 3 or more with reference to FIG. 8). When voiceprint recognition for the voice is necessary, the first electronic device 930 (e.g., the processor 120) may perform voiceprint recognition for the voice.

In operation 935, the first electronic device 930 (e.g., the processor 120) may determine whether the voiceprint recognition is successful. When it is determined that the voiceprint recognition is successful, that is, the voice was uttered by the user, the voice of which was authenticated, through the performance of the voiceprint recognition for the voice, in operation 936, the first electronic device 930 (e.g., the processor 120) may deliver the instruction to the second electronic device 950 through the communication circuit (e.g., the communication circuitry 140). Then, when the object as well as the instruction is included in the voice data, the first electronic device 930 also may deliver the object to the second electronic device 950.

According to an embodiment, the first electronic device 930 (e.g., the processor 120) may deliver the instruction and/or the object to the second electronic device 950 using, for example, and without limitation, short range communication, such as Bluetooth or NFC, or the like. Further, the first electronic device 930 may deliver the instruction and/or the object to the second electronic device 950 through a server or the like. Further, the first electronic device 930 (e.g., the processor 120) may store the information on at least one second electronic device 950 connected to the first electronic device 930 and may manage the information. For example, the first electronic device 930 may store the information on the second electronic device 950 in the memory in a form of a list.

In operation 951, the second electronic device 950 (e.g., the processor 120) may receive the instruction (and the object) through the communication circuit (e.g., the communication circuitry 140), and in operation 953, may perform a function corresponding to the instruction (and the object). The second electronic device 950 (e.g., the processor 120) may deliver the result for the performance of the function to the first electronic device 930 through the communication circuit, and in operation 937, the first electronic device 930 (e.g., the processor 120) may receive the performance result through the communication circuit. In operation 938, the first electronic device 930 may inform the user 910 of the result for the performance.

When the voiceprint recognition failed, that is, if it is determined that the voice was not a voice uttered from an authenticated user, the first electronic device 930 (e.g., the processor 120) may omit performances of operation 936 and operation 937, and in operation 938, may inform the user 910 that the voiceprint recognition failed.

According to an embodiment, in operation 934, when it is determined that the voiceprint recognition for the voice is not necessary, the first electronic device 930 (e.g., the processor 120) may deliver the instruction (and the object) to the second electronic device 950 through the communication circuit without performing voiceprint recognition.

Figure 10:
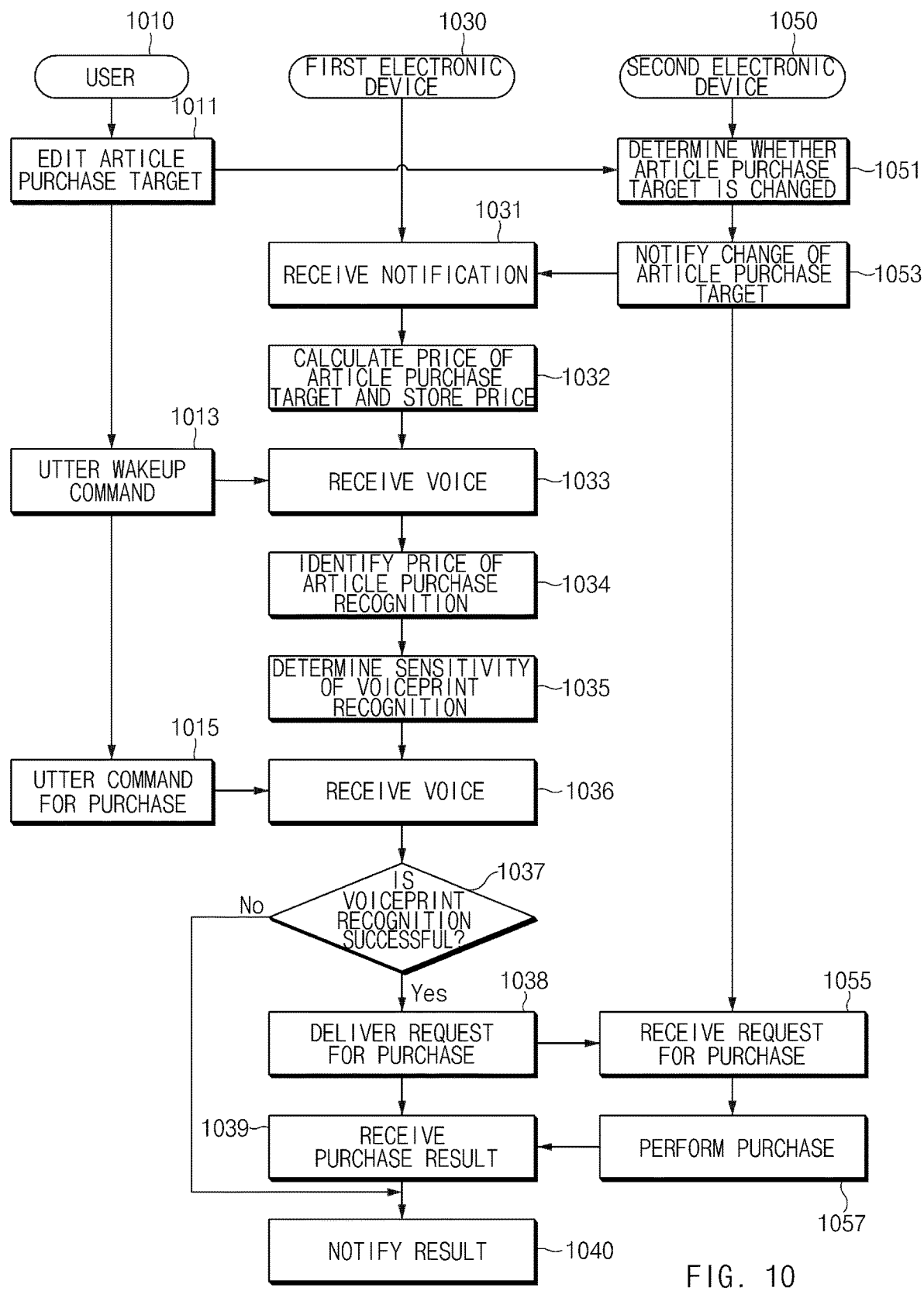
FIG. 10 is a flowchart illustrating an example method for purchasing an article through input of a voice according to an example embodiment of the present disclosure.

FIG. 10 is a flowchart illustrating an example method for purchasing an article through input of a voice according to an example embodiment of the present disclosure.

A first electronic device 1030 and a second electronic device 1050 according to an embodiment may include some or all configurations of the electronic device 100 of FIG. 1.

According to an embodiment, when an article is purchased through utterance of a voice of the user 1010, the sensitivity of the voiceprint recognition may be organically adjusted according to the importance of the article. For example, when the importance of the article is high, the sensitivity of the voiceprint recognition may be set to be high, and when the importance of the article is low, the sensitivity of the voiceprint recognition may be set to be low. According to an embodiment, the importance of the article may be differently set based, for example, on the prices of an article purchase target. For example, when a total price of the article purchase target exceeds a specific value, the importance of the article is set to be high, and when the total price of the article purchase target is the specific value or less, the importance of the article may be set to be low. According to an embodiment, the importance of the article may be differently set based, for example, on the number of the article purchase targets. For example, when the number of the purchased article purchase targets exceeds a specific number (e.g., 10), the importance of the article is set to be high, and when the number of the purchased article purchase targets is the specific number or less, the importance of the article may be set to be low. According to an embodiment, the importance of the article may be differently set based on at least one of the price of the article purchase target or the number of purchases.

Referring to FIG. 10, in operation 1011, the price of the article purchase target may be determined when the user 1010 edits the article purchase target. For example, when the user 1010 edits the article purchase target through a market basket function provided by an article purchase site or the like, the price of the article purchase target may be calculated. As an example, in operation 1051, the second electronic device 1050 (e.g., a server that manages the article purchase site) may determine whether the article purchase target has been changed. For example, the second electronic device 1050 (e.g., the processor 120) may determine the type or the number of the articles contained in the market basket (e.g., article purchase target) has been changed.

If the article purchase target has been changed, in operation 1053, the second electronic device 1050 (e.g., the processor 120) may inform the first electronic device 1030 of the change of the article purchase target through the communication circuit (e.g., the communication circuitry 140). In operation 1031, the first electronic device 1030 (e.g., the processor 120) may receive the notification through the communication circuit (e.g., the communication circuitry 140), and in operation 1032, may calculate the price of the article purchase target and store the calculated price in the memory (e.g., the memory 130).

Thereafter, in operation 1013, if a voice including a wake-up instruction for the first electronic device 1030 is uttered, in operation 1033, the first electronic device 1030 (e.g., the processor 120) may receive the voice through the microphone (e.g., the microphone 110) and in operation 1034, may identify the price of the article purchase target.

In operation 1035, the second electronic device 1030 (e.g., the processor 120) may determine the sensitivity of the voiceprint recognition for the voice, based on the price of the article purchase target. As an example, the first electronic device 1030 may set the sensitivity of the voiceprint recognition to be higher as the price of the article purchase target becomes higher.

Thereafter, in operation 1015, if a voice including a purchase instruction for the article purchase target is uttered, in operation 1036, the first electronic device 1030 (e.g., the processor 120) may receive the voice through the microphone (e.g., the microphone 110) and may perform voiceprint recognition for the voice. Then, the first electronic device 1030 (e.g., the processor 120) may perform the voiceprint recognition according to the sensitivity determined in operation 1035.

In operation 1037, the first electronic device 1030 (e.g., the processor 120) may determine whether the voiceprint recognition is successful. When it is determined that the voiceprint recognition is successful, that is, the voice was uttered by the user, the voice of which was authenticated, through the performance of the voiceprint recognition for the voice, in operation 1038, the first electronic device 1030 (e.g., the processor 120) may deliver a request for purchase of the article purchase target to the second electronic device 1050 through the communication circuit (e.g., the communication circuitry 140). In operation 1055, the second electronic device 1050 (e.g., the processor 120) may receive the request for the purchase through the communication circuit (e.g., the communication circuitry 140), and in operation 1057, may purchase the article purchase target. Further, the second electronic device 1050 (e.g., the processor 120) may transmit the result for the purchase of the article to the first electronic device 1030 through the communication circuit (e.g., the communication circuitry 140), and in operation 1039, the first electronic device 1030 (e.g., the processor 120) may receive the purchase result through the communication circuit (e.g., the communication circuitry 140) Further, in operation 1040, the first electronic device 1030 (e.g., the processor 120) may inform the user 1010 of the purchase result through the display (e.g., the display 150) and/or the speaker (e.g., the speaker 160).

When the voiceprint recognition failed in operation 1037, that is, if it is determined that the voice was not a voice uttered from an authenticated user, the first electronic device 1030 (e.g., the processor 120) may omit performances of operation 1038 and operation 1039, and in operation 1040, may inform the user 1010 that the voiceprint recognition failed.

According to an embodiment, in operation 1037, the first electronic device 1030 (e.g., the processor 120) may identify information (e.g., a sum that may be paid) related to an authority of the user 1010 while determining the success of the voiceprint recognition. In this case, the first electronic device 1030 (e.g. the processor 120) may determine delivery of the purchase request according to the authority of the user 1010. For example, if determining that the user 1010 has an authority for purchase, in operation 1038, the first electronic device 1030 (e.g., the processor 120) may deliver a request for purchase to the second electronic device 1050 through the communication circuit (e.g., the communication circuitry 140), and if it is determined that the user 1010 has no authority for purchase, may omit the performance of operation 1038 and operation 1039, and in operation 1040, may inform the user 1010 that the user 1010 has no authority for purchase through the display (e.g., the display 150) and/or the speaker (e.g., the speaker 160).

Figure 11:
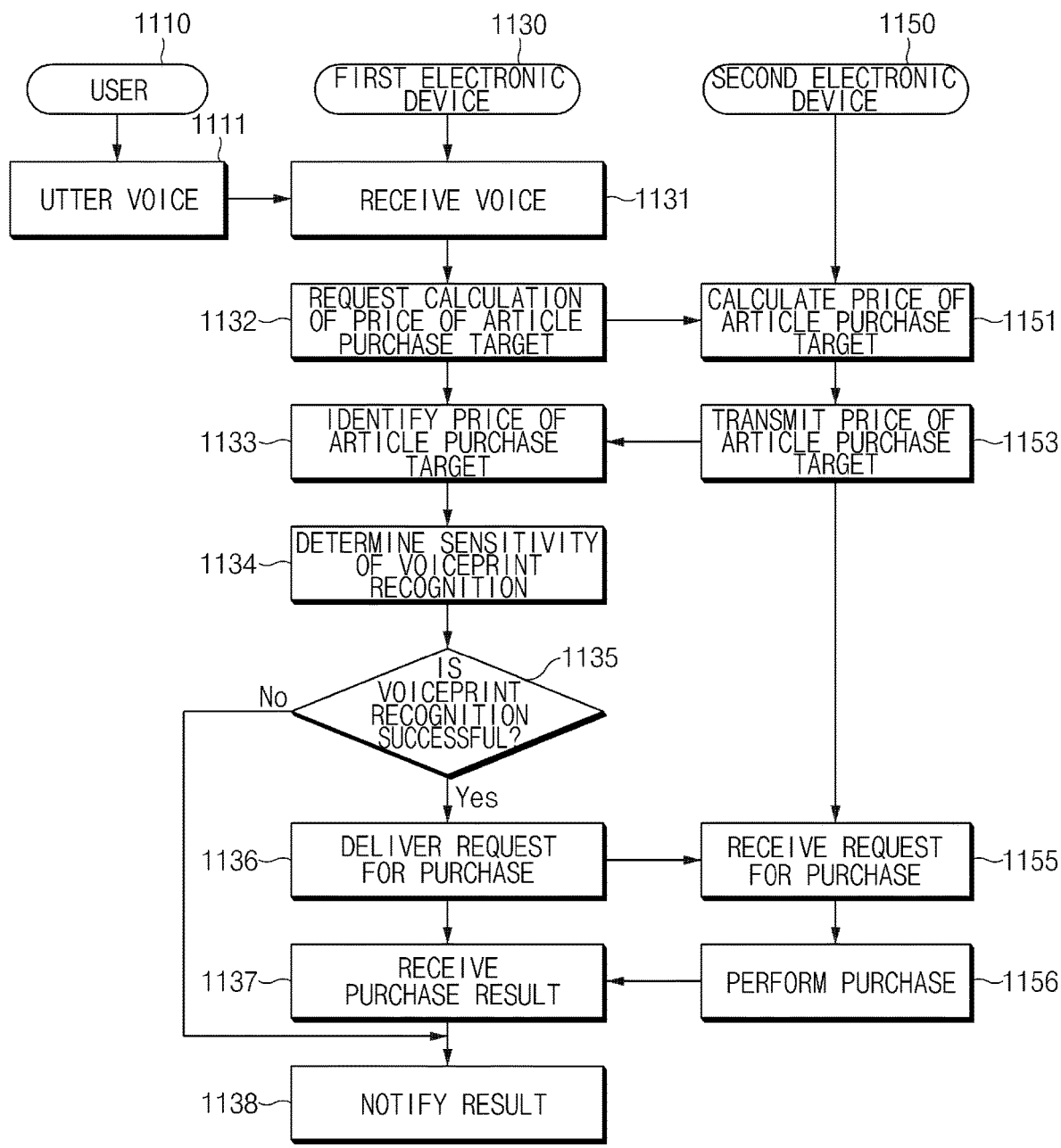
FIG. 11 is a flowchart illustrating another example method for managing a system for purchasing an article through input of a voice according to an example embodiment of the present disclosure.

FIG. 11 is a flowchart illustrating another example method for managing a system for purchasing an article through input of a voice according to an example embodiment of the present disclosure.

A first electronic device 1130 and a second electronic device 1150 according to an embodiment may include some or all configurations of the electronic device 100 of FIG. 1.

Referring to FIG. 11, the price of the article purchase target may be calculated in real time. For example, if the user 1110 (e.g., the user 1010) utters a voice including a purchase instruction for the article purchase target in operation 1111, the first electronic device 1130 (e.g., the first electronic device 1030) may receive the voice in operation 1131, and may request calculation of the price of the article purchase target from the second electronic device 1150 (e.g., the second electronic device 1050) s in operation 1132.

In operation 1151, the second electronic device 1150 (e.g., the processor 120) may calculate the price of the article purchase target, and in operation 1153, the calculated price of the article purchase target may be transmitted to the first electronic device 1130 through the communication circuit (e.g., the communication circuitry 140).

In operation 1133, the first electronic device 1130 (e.g., the processor 120) may identify the delivered price of the article purchase target. In operation 1134, the first electronic device 1130 (e.g., the processor 120) may determine the sensitivity of the voiceprint recognition for the voice, based on the price of the article purchase target, and may perform voiceprint recognition for the voice.

In operation 1135, the first electronic device 1130 (e.g., the processor 120) may determine whether the voiceprint recognition is successful. When it is determined that the voiceprint recognition is successful, that is, the voice was uttered by the user, the voice of which was authenticated, through the performance of the voiceprint recognition for the voice, in operation 1136, the first electronic device 1130 (e.g., the processor 120) may deliver a request for purchase of the article purchase target to the second electronic device 1150 through the communication circuit (e.g., the communication circuitry 140).

In operation 1155, the second electronic device 1150 (e.g., the processor 120) may receive the request for the purchase through the communication circuit (e.g., the communication circuitry 140), and in operation 1156, may purchase the article purchase target. Further, the second electronic device 1150 (e.g., the processor 120) may transmit the result for the article purchase to the first electronic device 1130 through the communication circuit, and in operation 1137, the first electronic device 1130 may receive the purchase result. Further, in operation 1138, the first electronic device 1138 (e.g., the processor 120) may inform the user of the purchase result through the display (e.g., the display 150) and/or the speaker (e.g., the speaker 160).

When the voiceprint recognition failed in operation 1135, that is, if it is determined that the voice was not a voice uttered from an authenticated user, the first electronic device 1130 (e.g., the processor 120) may omit performances of operation 1136 and operation 1137, and in operation 1138, may inform the user 1110 that the voiceprint recognition failed.

According to an embodiment, in operation 1135, the first electronic device 1130 (e.g., the processor 120) may identify information (e.g., a sum that may be paid) related to an authority of the user 1110 while determining the success of the voiceprint recognition. In this case, the first electronic device 1130 (e.g. the processor 120) may determine delivery of the purchase request according to the authority of the user 1110. For example, if it is determined that the user 1110 has an authority for purchase, in operation 1136, the first electronic device 1130 (e.g., the processor 120) may deliver a request for purchase to the second electronic device 1150 through the communication circuit. If it is determined that the user 1110 has no authority for purchase, the first electronic device 1130 (e.g., the processor 120) may omit the performances of operation 1136 and operation 1137, and in operation 1138, may inform the user that the user 1110 has not authority for purchase through the display and/or the speaker.

Figure 12A:
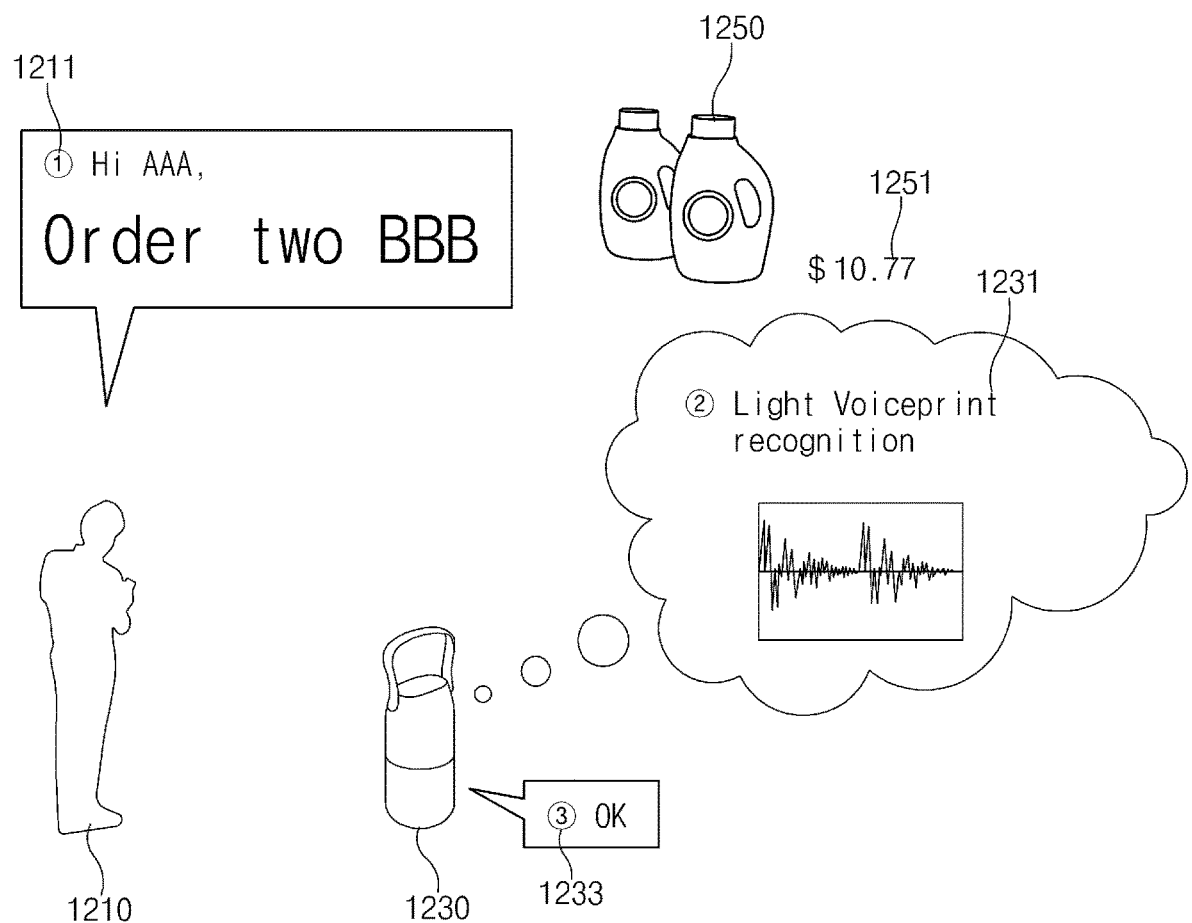
FIGS. 12A and 12B are diagrams illustrating an example method for inputting a voice based on the price of an article purchase target according to an example embodiment of the present disclosure.
Figure 12B:
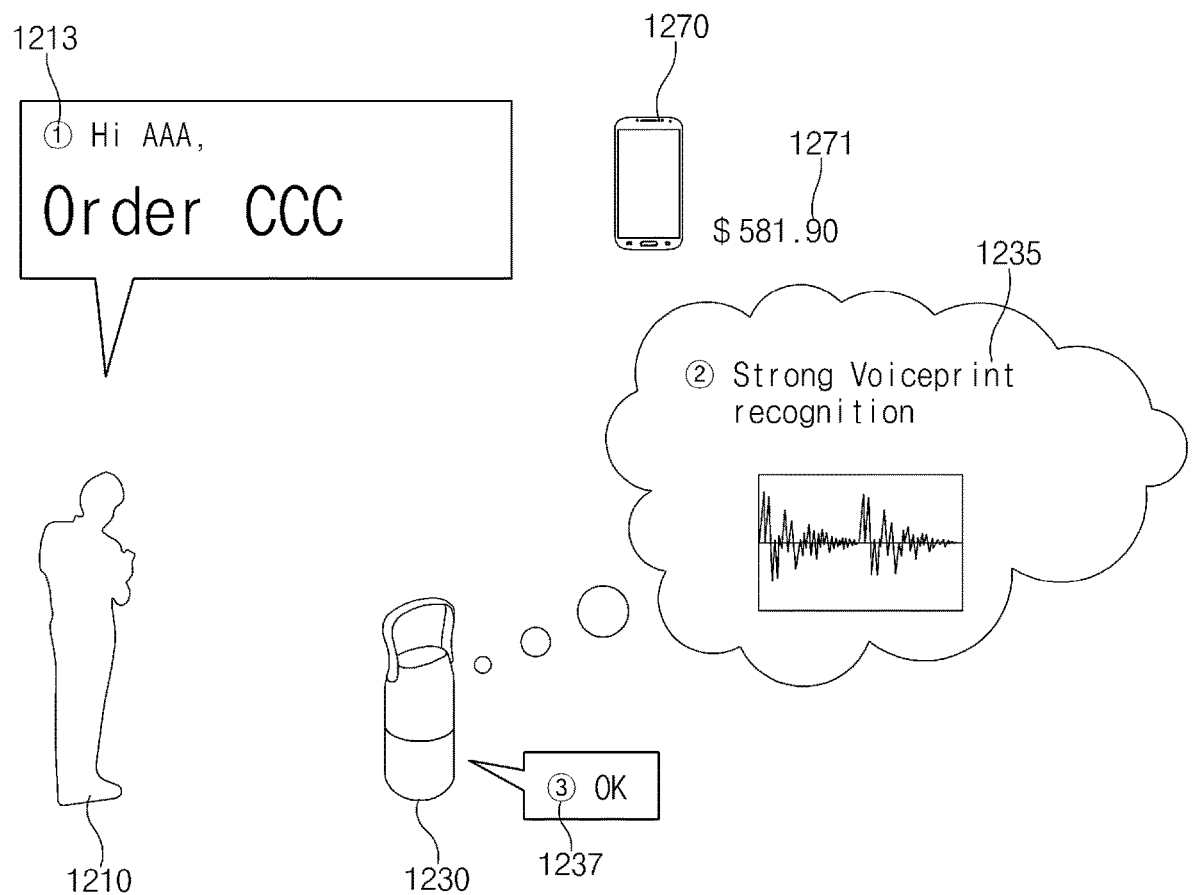

FIGS. 12A and 12B are diagrams illustrating an example method for inputting a voice based on the price of an article purchase target according to an example embodiment of the present disclosure.

The electronic device 1230 according to the embodiment may include some or all configurations of the electronic device 100 of FIG. 1.

Referring to FIGS. 12A and 12B, in operation 1211 and operation 1213, if the user 1210 utters a voice including a purchase instruction for a first article 1250 or a second article 1270, the electronic device 1230 (e.g., the processor 120) may calculate the price (or monetary value) of the first article 1250 or the second article 1270. Further, the electronic device 1230 (e.g., the processor 120) may determine the sensitivity of the voiceprint recognition for the voice based on the calculated prices of the articles.

As an example, referring to FIG. 12A, when the price 1251 of a first article 1250 is a specific value or less, as in operation 1231, the electronic device 1230 (e.g., the processor 120) may set the sensitivity of the voiceprint recognition to be lower. As an example, referring to FIG. 12A, when the price 1271 of a first article 1270 is a specific value or less, as in operation 1231, the electronic device 1230 (e.g., the processor 120) may set the sensitivity of the voiceprint recognition to be lower, and referring to FIG. 12B, when the price 1271 of a first article 1270 is a specific value or more, as in operation 1235, the electronic device 1230 (e.g., the processor 120) may set the sensitivity of the voiceprint recognition to be higher.

The electronic device 1230 (e.g., the processor 120) may perform voiceprint recognition for the voice based on the set sensitivity of the voice recognition, if it is determined that the voice is uttered by the user 1210 after the performance of the voiceprint recognition, may purchase the articles. Further, as in operation 1233 or operation 1237, the first electronic device 1230 (e.g., the processor 120) may inform the user 1210 of the purchase result through the display (e.g., the display 150) and/or the speaker (e.g., the speaker 160). In some embodiments, when the sensitivity of the voiceprint recognition is a specific value or less, the electronic device 1230 (e.g., the processor 120) may not perform the voiceprint recognition.

Figure 13:
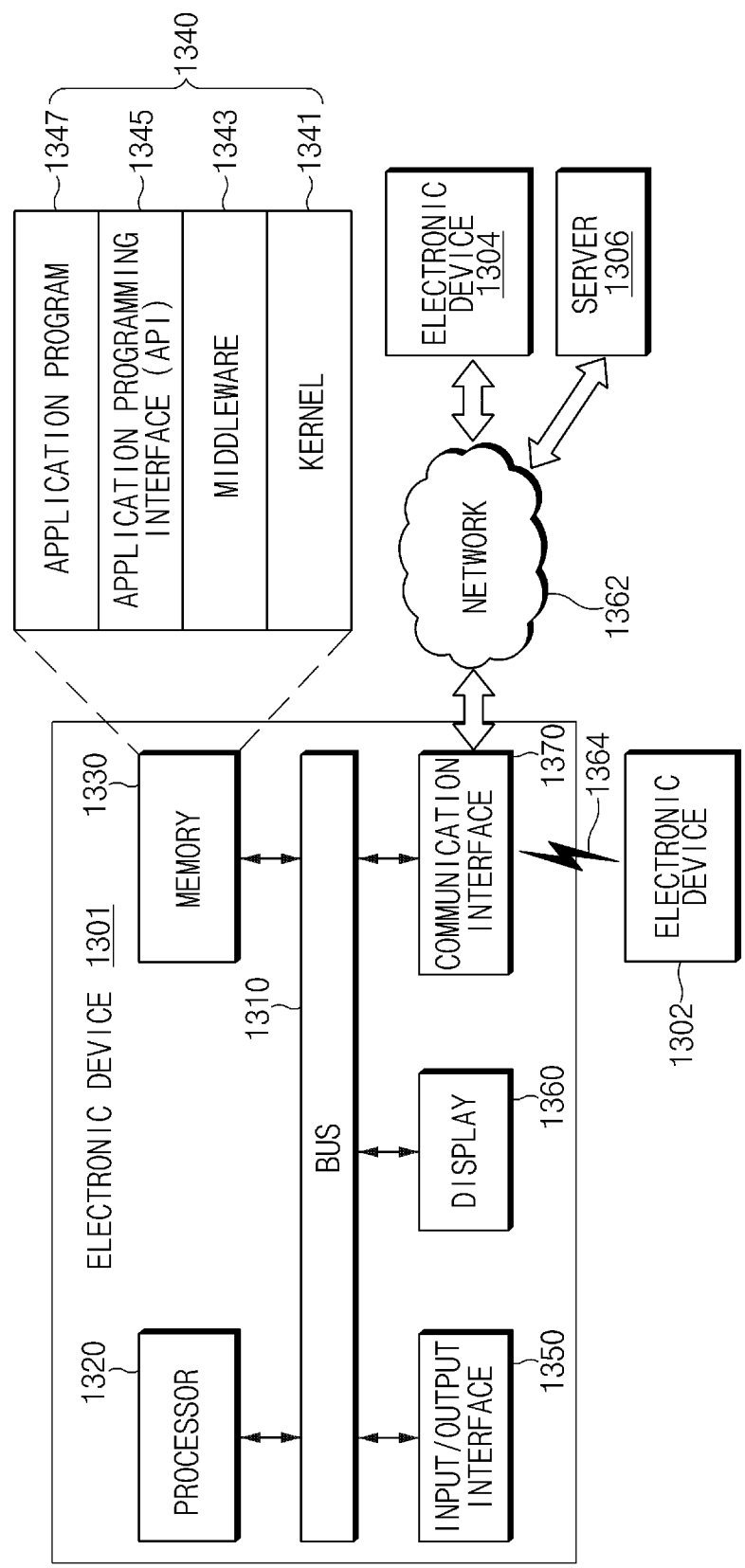
FIG. 13 is a diagram illustrating an example electronic device in a network environment according to an example embodiment of the present disclosure.

FIG. 13 is a diagram illustrating an example electronic device in a network environment according to an example embodiment of the present disclosure.

According to an embodiment, an electronic device 1301 may include, for example, a part or the entirety of the electronic device 100 illustrated in FIG. 1.

An electronic device 1301 in a network environment 1300 according to various embodiments of the present disclosure will be described with reference to FIG. 13. The electronic device 1301 may include a bus 1310, a processor (e.g., including processing circuitry) 1320, a memory 1330, an input/output interface (e.g., including input/output circuitry) 1350, a display 1360, and a communication interface (e.g., including communication circuitry) 1370. In various embodiments of the present disclosure, at least one of the foregoing elements may be omitted or another element may be added to the electronic device 1301.

The bus 1310 may include a circuit for connecting the above-mentioned elements 1310 to 1370 to each other and transferring communications (e.g., control messages and/or data) among the above-mentioned elements.

The processor 1320 may include various processing circuitry, such as, for example, and without limitation, at least one of a dedicated processor, a central processing unit (CPU), an application processor (AP), or a communication processor (CP), or the like. The processor 1320 may perform data processing or an operation related to communication and/or control of at least one of the other elements of the electronic device 1301.

The memory 1330 may include a volatile memory and/or a nonvolatile memory. The memory 1330 may store instructions or data related to at least one of the other elements of the electronic device 1301. According to an embodiment of the present disclosure, the memory 1330 may store software and/or a program 1340. The program 1340 may include, for example, a kernel 1341, a middleware 1343, an application programming interface (API) 1345, and/or an application program (or an application) 1347. At least a portion of the kernel 1341, the middleware 1343, or the API 1345 may be referred to as an operating system (OS).

The kernel 1341 may control or manage system resources (e.g., the bus 1310, the processor 1320, the memory 1330, or the like) used to perform operations or functions of other programs (e.g., the middleware 1343, the API 1345, or the application program 1347). Furthermore, the kernel 1341 may provide an interface for allowing the middleware 1343, the API 1345, or the application program 1347 to access individual elements of the electronic device 1301 in order to control or manage the system resources.

The middleware 1343 may serve as an intermediary so that the API 1345 or the application program 1347 communicates and exchanges data with the kernel 1341.

Furthermore, the middleware 1343 may handle one or more task requests received from the application program 1347 according to a priority order. For example, the middleware 1343 may assign at least one application program 1347 a priority for using the system resources (e.g., the bus 1310, the processor 1320, the memory 1330, or the like) of the electronic device 1301. For example, the middleware 1343 may handle the one or more task requests according to the priority assigned to the at least one application, thereby performing scheduling or load balancing with respect to the one or more task requests.

The API 1345, which is an interface for allowing the application 1347 to control a function provided by the kernel 1341 or the middleware 1343, may include, for example, at least one interface or function (e.g., instructions) for file control, window control, image processing, character control, or the like.

The input/output interface 1350 may include various input/output circuitry and serve to transfer an instruction or data input from a user or another external device to (an)other element(s) of the electronic device 1301. Furthermore, the input/output interface 1350 may output instructions or data received from (an)other element(s) of the electronic device 1301 to the user or another external device.

The display 1360 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 1360 may present various content (e.g., a text, an image, a video, an icon, a symbol, or the like) to the user. The display 1360 may include a touch screen, and may receive a touch, gesture, proximity or hovering input from an electronic pen or a part of a body of the user.

The communication interface 1370 may include various communication circuitry and set communications between the electronic device 1301 and an external device (e.g., a first external electronic device 1302, a second external electronic device 1304, or a server 1306). For example, the communication interface 1370 may be connected to a network 1362 via wireless communications or wired communications so as to communicate with the external device (e.g., the second external electronic device 1304 or the server 1306).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1364. The short-range communications may include at least one of wireless fidelity (Wi-Fi), Bluetooth, near field communication (NFC), magnetic stripe transmission (MST), or GNSS.

An MST may generate pulses according to transmission data and the pulses may generate electromagnetic signals. The electronic device 1301 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1362 may include at least one of telecommunications networks, for example, a computer network (e.g., local area network (LAN) or wide area network (WAN)), the Internet, or a telephone network.

The types of the first external electronic device 1302 and the second external electronic device 1304 may be the same as or different from the type of the electronic device 1301. According to an embodiment of the present disclosure, the server 1306 may include a group of one or more servers. A portion or all of operations performed in the electronic device 1301 may be performed in one or more other electronic devices (e.g., the first electronic device 1302, the second external electronic device 1304, or the server 1306). When the electronic device 1301 should perform a certain function or service automatically or in response to a request, the electronic device 1301 may request at least a portion of functions related to the function or service from another device (e.g., the first electronic device 1302, the second external electronic device 1304, or the server 1306) instead of or in addition to performing the function or service for itself. The other electronic device (e.g., the first electronic device 1302, the second external electronic device 1304, or the server 1306) may perform the requested function or additional function, and may transfer a result of the performance to the electronic device 1301. The electronic device 1301 may use a received result itself or additionally process the received result to provide the requested function or service. To this end, for example, a cloud computing technology, a distributed computing technology, or a client-server computing technology may be used.

Figure 14:
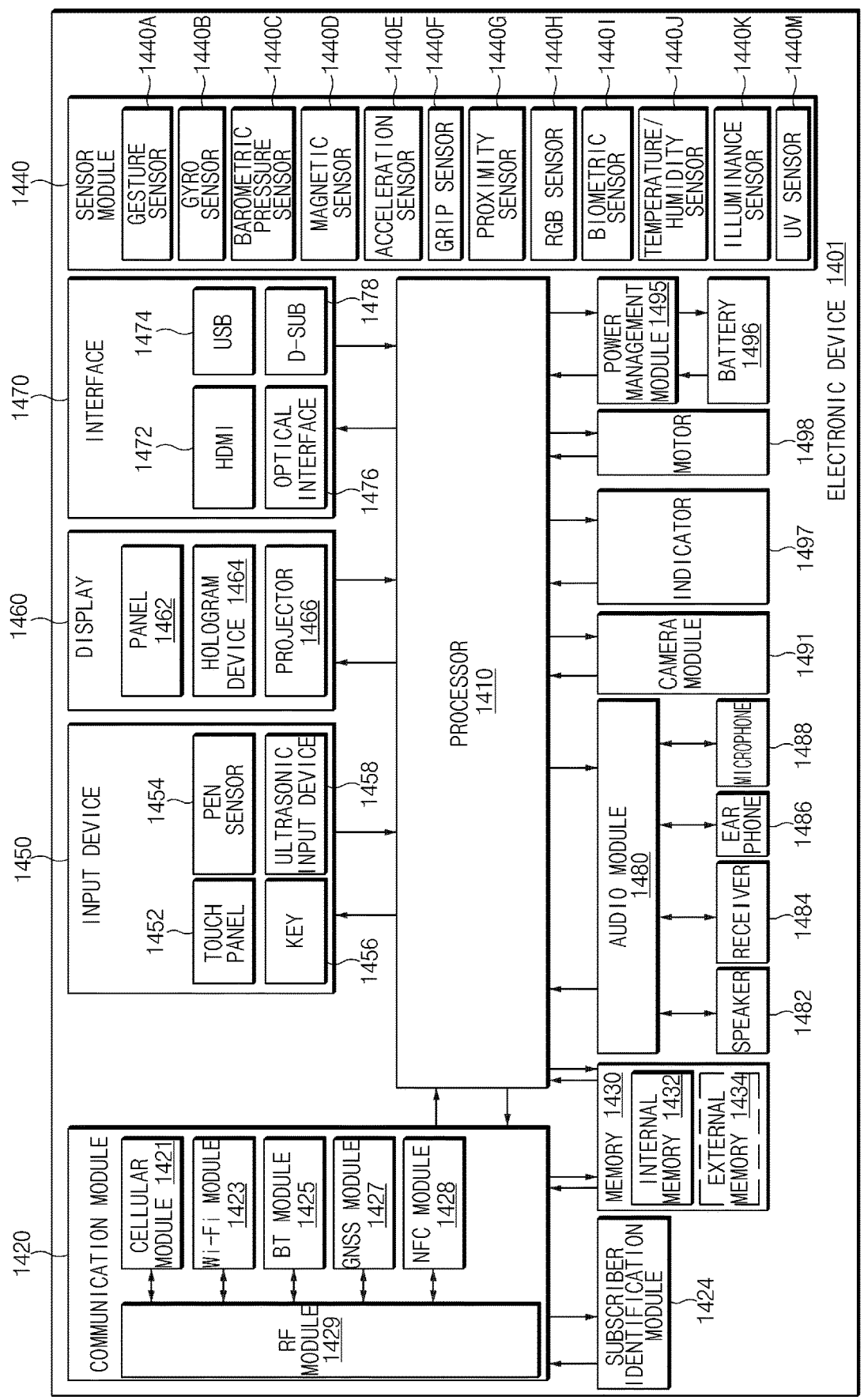
FIG. 14 is a block diagram illustrating an example electronic device according to an example embodiment of the present disclosure.

FIG. 14 is a block diagram illustrating an example electronic device according to an example embodiment of the present disclosure.

Referring to FIG. 14, an electronic device 1401 may include, for example, a part or the entirety of the electronic device 100 illustrated in FIG. 1 or the electronic device 1301 illustrated in FIG. 13. The electronic device 1401 may include at least one processor (e.g., AP) (e.g., including processing circuitry) 1410, a communication module (e.g., including communication circuitry) 1420, a subscriber identification module (SIM) 1424, a memory 1430, a sensor module 1440, an input device (e.g., including input circuitry) 1450, a display 1460, an interface (e.g., including interface circuitry) 1470, an audio module 1480, a camera module 1491, a power management module 1495, a battery 1496, an indicator 1497, and a motor 1498.

The processor 1410 may include various processing circuitry and run an operating system or an application program so as to control a plurality of hardware or software elements connected to the processor 1410, and may process various data and perform operations. The processor 1410 may be implemented with, for example, a system on chip (SoC). According to an embodiment of the present disclosure, the processor 1410 may further include a graphic processing unit (GPU) and/or an image signal processor. The processor 1410 may include at least a portion (e.g., a cellular module 1421) of the elements illustrated in FIG. 14. The processor 1410 may load, on a volatile memory, an instruction or data received from at least one of other elements (e.g., a nonvolatile memory) to process the instruction or data, and may store various data in a nonvolatile memory.

The communication module 1420 may have a configuration that is the same as or similar to that of the communication interface 1370 of FIG. 13. The communication module 1420 may include various communication circuitry, such as, for example, and without limitation, one or more of a cellular module 1421, a Wi-Fi module 1423, a Bluetooth (BT) module 1425, a GNSS module 1427 (e.g., a GPS module, a GLONASS module, a BeiDou module, or a Galileo module), an NFC module 1428, and a radio frequency (RF) module 1429.

The cellular module 1421 may provide, for example, a voice call service, a video call service, a text message service, or an Internet service through a communication network. The cellular module 1421 may identify and authenticate the electronic device 1401 in the communication network using the subscriber identification module 1424 (e.g., a SIM card). The cellular module 1421 may perform at least a part of functions that may be provided by the processor 1410. The cellular module 1421 may include a communication processor (CP).

Each of the Wi-Fi module 1423, the Bluetooth module 1425, the GNSS module 1427 and the NFC module 1428 may include, for example, a processor for processing data transmitted/received through the modules. According to some various embodiments of the present disclosure, at least a part (e.g., two or more) of the cellular module 1421, the Wi-Fi module 1423, the Bluetooth module 1425, the GNSS module 1427, and the NFC module 1428 may be included in a single integrated chip (IC) or IC package.

The RF module 1429 may transmit/receive, for example, communication signals (e.g., RF signals). The RF module 1429 may include, for example, a transceiver, a power amp module (PAM), a frequency filter, a low noise amplifier (LNA), an antenna, or the like. According to another embodiment of the present disclosure, at least one of the cellular module 1421, the Wi-Fi module 1423, the Bluetooth module 1425, the GNSS module 1427, or the NFC module 1428 may transmit/receive RF signals through a separate RF module.

The SIM 1424 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1430 (e.g., the memory 1330) may include, for example, an internal memory 1432 and/or an external memory 1434. The internal memory 1432 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1434 may include a flash drive such as a compact flash (CF), a secure digital (SD), a Micro-SD, a Mini-SD, an extreme digital (xD), a MultiMediaCard (MMC), a memory stick, or the like. The external memory 1434 may be operatively and/or physically connected to the electronic device 1401 through various interfaces.

The sensor module 1440 may, for example, measure physical quantity or detect an operation state of the electronic device 1401 and convert measured or detected information into an electrical signal. The sensor module 1440 may include, for example, at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a color sensor 1440H (e.g., a red/green/blue (RGB) sensor), a biometric sensor 1440I, a temperature/humidity sensor 1440J, an illumination (illuminance) sensor 1440K, or an ultraviolet (UV) sensor 1440M. Additionally or alternatively, the sensor module 1440 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1440 may further include a control circuit for controlling at least one sensor included therein. In some various embodiments of the present disclosure, the electronic device 1401 may further include a processor configured to control the sensor module 1440 as a part of the processor 1410 or separately, so that the sensor module 1440 is controlled while the processor 1410 is in a sleep state.

The input device 1450 may include various input circuitry, such as, for example, and without limitation, a touch panel 1452, a (digital) pen sensor 1454, a key 1456, or an ultrasonic input device 1458, or the like. The touch panel 1452 may employ at least one of capacitive, resistive, infrared, and ultraviolet sensing methods. The touch panel 1452 may further include a control circuit. The touch panel 1452 may further include a tactile layer so as to provide a haptic feedback to a user.

The (digital) pen sensor 1454 may include, for example, a sheet for recognition which is a part of a touch panel or is separate. The key 1456 may include, for example, a physical button, an optical button, or a keypad. The ultrasonic input device 1458 may sense ultrasonic waves generated by an input tool through a microphone 1488 to identify data corresponding to the ultrasonic waves sensed.

The display 1460 (e.g., the display 1360) may include a panel 1462, a hologram device 1464, or a projector 1466. The panel 1462 may have a configuration that is the same as or similar to that of the display 1360 of FIG. 13. The panel 1462 may be, for example, flexible, transparent, or wearable. The panel 1462 and the touch panel 1452 may be integrated into a single module. The hologram device 1464 may display a stereoscopic image in a space using a light interference phenomenon. The projector 1466 may project light onto a screen so as to display an image. The screen may be disposed in the inside or the outside of the electronic device 1401. According to an embodiment of the present disclosure, the display 1460 may further include a control circuit for controlling the panel 1462, the hologram device 1464, or the projector 1466.

The interface 1470 may include various interface circuitry, such as, for example, and without limitation, an HDMI 1472, a USB 1474, an optical interface 1476, or a D-subminiature (D-sub) 1478, or the like. The interface 1470, for example, may be included in the communication interface 1370 illustrated in FIG. 13. Additionally or alternatively, the interface 1470 may include, for example, a mobile high-definition link (MHL) interface, an SD card/multi-media card (MMC) interface, or an infrared data association (IrDA) interface.

The audio module 1480 may convert, for example, a sound into an electrical signal or vice versa. At least a portion of elements of the audio module 1480 may be included in the input/output interface 1350 illustrated in FIG. 13. The audio module 1480 may process sound information input or output through a speaker 1482, a receiver 1484, an earphone 1486, or the microphone 1488.

The camera module 1491 is, for example, a device for shooting a still image or a video. According to an embodiment of the present disclosure, the camera module 1491 may include at least one image sensor (e.g., a front sensor or a rear sensor), a lens, an image signal processor (ISP), or a flash (e.g., an LED or a xenon lamp).

The power management module 1495 may manage power of the electronic device 1401. According to an embodiment of the present disclosure, the power management module 1495 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, or the like. The motor 1498 may convert an electrical signal into a mechanical vibration, and may generate a vibration or haptic effect. Although not illustrated, a processing device (e.g., a GPU) for supporting a mobile TV may be included in the electronic device 1401. The processing device for supporting a mobile TV may process media data according to the standards of digital multimedia broadcasting (DMB), digital video broadcasting (DVB), Media-FLO™, or the like.

Each of the elements described herein may include one or more components, and the names of the elements may be changed based on the type of an electronic device. In various embodiments of the present disclosure, an electronic device may include at least one of the elements described herein, and some elements may be omitted or other additional elements may be added. Furthermore, some of the elements of the electronic device may be combined with each other to form one entity, so that the functions of the elements may be performed in the same manner as before the combination.

Figure 15:
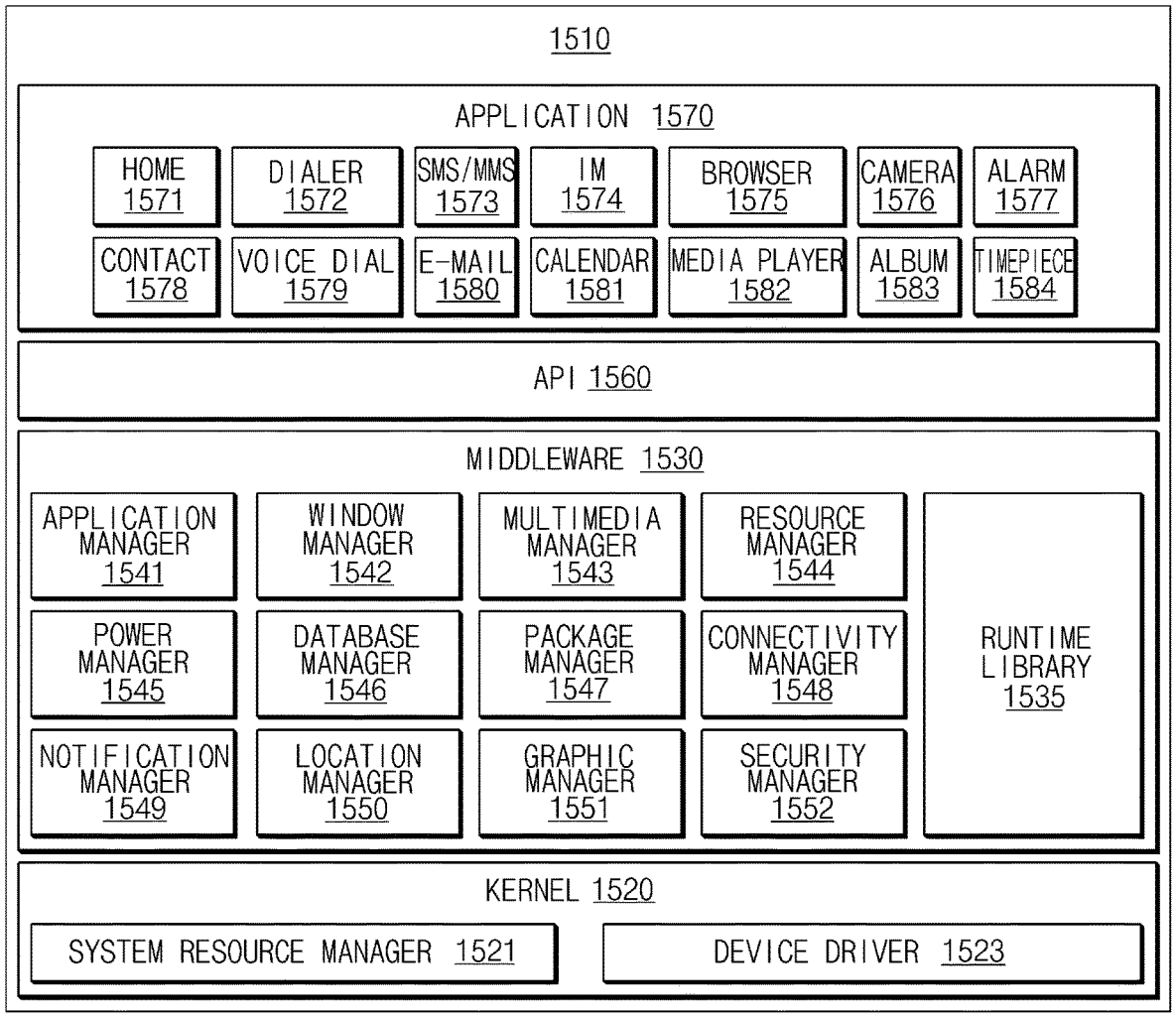
FIG. 15 is a block diagram illustrating an example program module according to an example embodiment of the present disclosure.

FIG. 15 is a block diagram illustrating an example program module according to an example embodiment of the present disclosure.

Referring to FIG. 15, a program module 1510 (e.g., the program 1340) may include an operating system (OS) for controlling a resource related to an electronic device (e.g., the electronic device 1301) and/or various applications (e.g., the application program 1347) running on the OS. The operating system may be, for example, Android, iOS, Windows, Symbian, Tizen, or the like.

The program module 1510 may include a kernel 1520, a middleware 1530, an API 1560, and/or an application 1570. At least a part of the program module 1510 may be preloaded on an electronic device or may be downloaded from an external electronic device (e.g., the first electronic device 1302, the second external electronic device 1304, or the server 1306).

The kernel 1520 (e.g., the kernel 1341) may include, for example, a system resource manager 1521 and/or a device driver 1523. The system resource manager 1521 may perform control, allocation, or retrieval of a system resource. According to an embodiment of the present disclosure, the system resource manager 1521 may include a process management unit, a memory management unit, a file system management unit, or the like. The device driver 1523 may include, for example, a display driver, a camera driver, a Bluetooth driver, a shared memory driver, a USB driver, a keypad driver, a Wi-Fi driver, an audio driver, or an inter-process communication (IPC) driver.

The middleware 1530, for example, may provide a function that the applications 1570 require in common, or may provide various functions to the applications 1570 through the API 1560 so that the applications 1570 may efficiently use limited system resources in the electronic device. According to an embodiment of the present disclosure, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include, for example, a library module that a complier uses to add a new function through a programming language while the application 1570 is running. The runtime library 1535 may perform a function for input/output management, memory management, or an arithmetic function.

The application manager 1541 may mange, for example, a life cycle of at least one of the applications 1570. The window manager 1542 may manage a GUI resource used in a screen. The multimedia manager 1543 may recognize a format required for playing various media files and may encode or decode a media file using a codec matched to the format. The resource manager 1544 may manage a resource such as a source code, a memory, or a storage space of at least one of the applications 1570.

The power manager 1545, for example, may operate together with a basic input/output system (BIOS) to manage a battery or power and may provide power information required for operating the electronic device. The database manager 1546 may generate, search, or modify a database to be used in at least one of the applications 1570. The package manager 1547 may manage installation or update of an application distributed in a package file format.

The connectivity manger 1548 may manage wireless connection of Wi-Fi, Bluetooth, or the like. The notification manager 1549 may display or notify an event such as message arrival, appointments, and proximity alerts in such a manner as not to disturb a user. The location manager 1550 may manage location information of the electronic device. The graphic manager 1551 may manage a graphic effect to be provided to a user or a user interface related thereto. The security manager 1552 may provide various security functions required for system security or user authentication. According to an embodiment of the present disclosure, in the case in which an electronic device (e.g., the electronic device 1301) includes a phone function, the middleware 1530 may further include a telephony manager for managing a voice or video call function of the electronic device.

The middleware 1530 may include a middleware module for forming a combination of various functions of the above-mentioned elements. The middleware 1530 may provide a module specialized for each type of an operating system to provide differentiated functions. Furthermore, the middleware 1530 may delete a part of existing elements or may add new elements dynamically.

The API 1560 (e.g., the API 1345) which is, for example, a set of API programming functions may be provided in different configurations according to an operating system. For example, in the case of Android or iOS, one API set may be provided for each platform, and, in the case of Tizen, at least two API sets may be provided for each platform.

The application 1570 (e.g., the application program 1347), for example, may include at least one application capable of performing functions such as a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, a clock (timepiece) 1584, or the like. Additionally, though not illustrated, the application 1570 may include various other applications, including, for example, and without limitation, health care (e.g., measure an exercise amount or blood sugar), or environmental information provision (e.g., provide air pressure, humidity, or temperature information).

According to an embodiment of the present disclosure, the application 1570 may include an information exchange application for supporting information exchange between the electronic device (e.g., the electronic device 1301) and an external electronic device (e.g., the first electronic device 1302 or the second external electronic device 1304). The information exchange application may include, for example, a notification relay application for relaying specific information to the external electronic device or a device management application for managing the external electronic device.

For example, the notification relay application may have a function for relaying, to an external electronic device (e.g., the first electronic device 1302 or the second external electronic device 1304), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1302 or the second external electronic device 1304) communicating with the electronic device, an application running in the external electronic device, or a service (e.g., a call service, a message service, or the like) provided from the external electronic device.

According to an embodiment of the present disclosure, the application 1570 may include a specified application (e.g., a healthcare application of a mobile medical device) according to an attribute of the external electronic device (e.g., the first electronic device 1302 or the second external electronic device 1304). The application 1570 may include an application received from an external electronic device (e.g., the first electronic device 1302 or the second external electronic device 1304). The application 1570 may include a preloaded application or a third-party application downloadable from a server. The names of the elements of the program module 1510 illustrated may vary with the type of an operating system.

According to various embodiments of the present disclosure, at least a part of the program module 1510 may be implemented with software, firmware, hardware, or any combination thereof. At least a part of the program module 1510, for example, may be implemented (e.g., executed) by a processor (e.g., the processor 1410). At least a part of the program module 1510 may include, for example, a module, a program, a routine, sets of instructions, or a process for performing at least one function.

As described above, according to various embodiments, an electronic device (e.g., the electronic device 100) may include a microphone (e.g., the microphone 110) configured to receive a voice, communication circuitry (e.g., the communication circuitry 140) configured to communicate with an external electronic device, a memory (e.g., the memory 130), and a processor (e.g., the processor 120) operatively connected to the microphone, the communication circuitry, and the memory. The memory may store instructions that, when executed by the processor, cause the electronic device to perform voice recognition for voice data corresponding to the voice, and determine whether to perform voiceprint recognition for the voice data based on whether a first expression is included in a performance result of the voice recognition.

According to various example embodiments, the memory may further store instructions that, when executed by the processor, cause the electronic device to perform the voiceprint recognition for the voice data when the first expression is included in the performance result of the voice recognition, and perform a function corresponding to the first expression when the voice is a voice uttered by a specific user, based on a performance result of the voiceprint recognition.

According to various example embodiments, the memory may further store instructions that, when executed by the processor, cause the electronic device to transmit a signal corresponding to the function to the external electronic device through the communication circuitry.

According to various example embodiments, the memory may further store instructions that, when executed by the processor, cause the electronic to determine a security level of the first expression, and adjust a sensitivity of the voiceprint recognition based on the security level of the first expression.

According to various example embodiments, the memory may further store instructions that, when executed by the processor, cause the electronic device to acquire the voice data from the external electronic device through the communication circuitry.

According to various example embodiments, the memory may further store instructions that, when executed by the processor, cause the electronic device to determine a security level of a second expression when, in addition to the first expression, the second expression is included in the performance result of the voice recognition, and adjust a sensitivity of the voiceprint recognition based on the security level of the second expression.

According to various example embodiments, the memory may further store instructions that, when executed by the processor, cause the electronic device to determine the security level of the second expression based on at least one of user history information for the second expression, a monetary value of an object corresponding to the second expression, and location information of the object.

According to various example embodiments, the memory may further store instructions that, when executed by the processor, cause the electronic device to perform the voiceprint recognition for the voice data when the first expression is included in the performance result of the voice recognition, and provide a notification notifying that an auxiliary authentication is required when the auxiliary authentication for determining whether the voice is a voice uttered by a specific user is required, based on a performance result of the voiceprint recognition.

According to various example embodiments, the memory may further store instructions that, when executed by the processor, cause the electronic device to acquire at least one of fingerprint recognition, iris recognition, and password authentication information with the auxiliary authentication.

As described above, according to various example embodiments, a voice inputting method for an electronic device may include acquiring voice data, performing voice recognition for the voice data, determining whether a first expression is included in a performance result of the voice recognition, and determining whether to perform voiceprint recognition for the voice data based on whether the first expression is included in the performance result of the voice recognition.

According to various example embodiments, the voice input method may further include performing the voiceprint recognition for the voice data when the first expression is included in the performance result of the voice recognition, and performing a function corresponding to the first expression when the voice data is voice data corresponding to a voice by a specific user, based on a performance result of the voiceprint recognition.

According to various example embodiments, the performing of the function may include transmitting a signal corresponding to the function to an external electronic device through a communication circuitry.

According to various example embodiments, the voice input method may further include determining a security level of the first expression, and adjusting a sensitivity of the voiceprint recognition based on the security level of the first expression.

According to various example embodiments, the acquiring of the voice data may include acquiring the voice data through a microphone or from an external electronic device through a communication circuitry.

According to various example embodiments, the voice input method may further include determining a security level of a second expression when, in addition to the first expression, the second expression is included in the performance result of the voice recognition, and adjusting a sensitivity of the voiceprint recognition according to the security level of the second expression.

According to various example embodiments, the determining of the security level of the second expression may include determining the security level of the second expression based on at least one of user history information for the second expression, a monetary value of an object corresponding to the second expression, and location information of the object.

According to various example embodiments, the voice input method may further include performing the voiceprint recognition for the voice data when the first expression is included in the performance result of the voice recognition, and providing a notification notifying that an auxiliary authentication is required when the auxiliary authentication for determining whether the voice data is voice data corresponding to a voice uttered by a specific user is required, based on a performance result of the voiceprint recognition.

According to various example embodiments, the voice input method may further include acquiring at least one of fingerprint recognition, iris recognition, and password authentication information with the auxiliary authentication.

As described above, according to various example embodiments, a system (e.g., the electronic device 100) may include a communication interface (e.g., the communication circuitry 140), a processor (e.g., the processor 120) electrically connected to the communication interface, and a memory (e.g., the memory 130) electrically connected to the processor. The memory may store instructions that, when executed by the processor, cause an electronic device to receive voice data including a request through the communication interface, convert the voice data to text data, determine whether the text data includes a selected text, compare a portion of the voice data corresponding to the selected text with reference voice data stored in the memory if the text data includes the selected text, process the request if the portion of the voice data coincides with the reference voice data, and reject the request if the portion of the voice data does not coincide with the reference voice data.

As described above, according to various example embodiments, the system (e.g., the electronic device 100) may include a microphone (e.g., the microphone 110), a processor (e.g., the processor 120) electrically connected to the microphone, and a memory (e.g., the memory 130) electrically connected to the processor, and the memory may store instructions that, when executed by the processor, cause an electronic device to receive voice data including a request through the microphone, convert the voice data to text data, determine whether the text data includes a selected text, compare a portion of the voice data corresponding to the selected text with reference voice data stored in the memory, and if the portion of the voice data coincides with the reference voice data, process the request, and if the portion of the voice data does not coincide with the reference voice data, reject the request.

The term "module" used herein may refer, for example, to a unit including one of hardware, software and firmware or any combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific integrated circuit (ASIC) chip, a field-programmable gate array (FPGA), and a programmable-logic device for performing some operations, or the like, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1320), the processor may perform functions corresponding to the instructions. The computer-readable storage medium may be, for example, the memory 1330.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the scope of the present disclosure. Therefore, the scope of the present disclosure should not be limited to the example embodiments, but should be defined by the appended claims and equivalents thereof.

What is claimed is:

1. An electronic device comprising:
   a microphone configured to receive a voice;
   communication circuitry configured to communicate with an external electronic device;
   a memory; and
   a processor operatively connected to the microphone, the communication circuitry, and the memory,
   wherein the memory stores instructions that, when executed by processor, cause the electronic device to:
   perform voice recognition for voice data corresponding to the voice;
   determine an instruction and an object from a result of the voice recognition, wherein the instruction is an expression corresponding to a function performed by the electronic device, and the object is a target of the instruction;
   determine a security level of the instruction extracted from the result of the voice recognition;
   determine a security level of the object extracted from the result of the voice recognition;
   determine whether to perform voiceprint recognition for the voice data based on whether the expression is corresponding to a first expression; and
   after determining to perform voiceprint recognition, determine a sensitivity for the voiceprint recognition based on both: (a) the security level of the instruction, and (b) the security level of the object.

2. The electronic device of claim 1, wherein the memory further stores instructions that, when executed by the processor, cause the electronic device to:
   perform the voiceprint recognition for the voice data when the expression is corresponding to the first expression; and
   perform the function corresponding to the first expression when the voice is a voice uttered by a specific user, based on a result of the voiceprint recognition.

3. The electronic device of claim 2, wherein the memory further stores instructions that, when executed by the processor, cause the electronic device to:
   transmit a signal corresponding to the function to the external electronic device through the communication circuitry.

4. The electronic device of claim 1, wherein the memory further stores instructions that, when executed by the processor, cause the electronic device to:
   acquire the voice data from the external electronic device through the communication circuitry.

5. The electronic device of claim 1, wherein the memory further stores instructions that, when executed by the processor, cause the electronic device to:
   determine a security level of a second expression when, in addition to the first expression, the second expression is included in the result of the voice recognition; and
   adjust a sensitivity of the voiceprint recognition based on the security level of the second expression.

6. The electronic device of claim 5, wherein the memory further stores instructions that, when executed by the processor, cause the electronic device to:
   determine the security level of the second expression based on at least one of: user history information for the second expression, a monetary value of the object corresponding to the second expression, and location information of the object.

7. The electronic device of claim 1, wherein the memory further stores instructions that, when executed by the processor, cause the electronic device to:
   perform the voiceprint recognition for the voice data when the expression is corresponding to the first expression; and
   provide a notification that an auxiliary authentication is required, based on a result of the voiceprint recognition when the auxiliary authentication for determining whether the voice is a voice uttered by a specific user is required.

8. The electronic device of claim 7, wherein the memory further stores instructions that, when executed by the processor, cause the electronic device to:
   acquire at least one of: fingerprint recognition, iris recognition, and password authentication information with the auxiliary authentication.

9. A voice input method for an electronic device, comprising:
   acquiring voice data;
   performing voice recognition for the voice data;
   determining an instruction and an object from a result of the voice recognition, wherein the instruction is an expression corresponding to a function performed by the electronic device, and the object is a target of the instruction;
   determining a security level of the instruction extracted from the result of the voice recognition;
   determining a security level of the object extracted from the result of the voice recognition;
   determining whether to perform voiceprint recognition for the voice data based on whether the expression is corresponding to a first expression; and
   after determining to perform voiceprint recognition, determining a sensitivity for the voiceprint recognition based on both: (a) the security level of the instruction, and (b) the security level of the object.

10. The voice input method of claim 9, further comprising:
- performing the voiceprint recognition for the voice data when the expression is corresponding to the first expression; and
- performing the function corresponding to the first expression based on a result of the voiceprint recognition when the voice data is voice data corresponding to a voice by a specific user.

11. The voice input method of claim 10, wherein the performing of the function includes:
- transmitting a signal corresponding to the function to an external electronic device through communication circuitry.

12. The voice input method of claim 9, wherein the acquiring of the voice data includes:
- acquiring the voice data through a microphone and/or from an external electronic device through communication circuitry.

13. The voice input method of claim 9, further comprising:
- determining a security level of a second expression when, in addition to the first expression, the second expression is included in the result of the voice recognition; and
- adjusting a sensitivity of the voiceprint recognition based on the security level of the second expression.

14. The voice input method of claim 13, wherein the determining of the security level of the second expression includes:
- determining the security level of the second expression based on at least one of: user history information for the second expression, a monetary value of the object corresponding to the second expression, and location information of the object.

15. The voice input method of claim 9, further comprising:
- performing the voiceprint recognition for the voice data when the expression is corresponding to the first expression; and
- providing a notification that an auxiliary authentication is required, based on a performance result of the voiceprint recognition when the auxiliary authentication for determining whether the voice data is voice data corresponding to a voice uttered by a specific user is required.

16. The voice input method of claim 15, further comprising:
- acquiring at least one of: fingerprint recognition, iris recognition, and password authentication information with the auxiliary authentication.

17. A system comprising:
- a communication interface comprising communication circuitry;
- a processor electrically connected to the communication interface; and
- a memory electrically connected to the processor,
- wherein the memory stores instructions that, when executed by the processor, cause an electronic device to:
- receive voice data including a request through the communication interface;
- convert the voice data to text data;
- determine whether the text data includes an instruction and an object, wherein the instruction is an expression corresponding to a function performed by the electronic device, and the object is a target of the instruction;
- determine a security level of the instruction extracted from the text data;
- determine a security level of the object extracted from the text data;
- determine whether to compare a portion of the voice data corresponding to a selected text with reference voice data stored in the memory if the text data is corresponding to the selected text;
- process the request if the portion of the voice data coincides with the reference voice data;
- reject the request if the portion of the voice data does not coincide with the reference voice data; and
- after determining to perform voiceprint recognition,
- determining a sensitivity for the voiceprint recognition based on both: (a) the security level of the instruction, and (b) the security level of the object.

* * * * *